United States Patent [19]
Anderson

[11] Patent Number: 6,126,890
[45] Date of Patent: Oct. 3, 2000

[54] IN-LINE MATERIAL HANDLING SYSTEM WITH PALLET BASKETS

[75] Inventor: Harry E. Anderson, Pittsburgh, Pa.

[73] Assignee: WCBM, Johnstown, Pa.

[21] Appl. No.: 09/000,331

[22] PCT Filed: Jul. 30, 1996

[86] PCT No.: PCT/US96/12463

§ 371 Date: Jan. 29, 1998

§ 102(e) Date: Jan. 29, 1998

[87] PCT Pub. No.: WO97/04911

PCT Pub. Date: Feb. 13, 1997

[51] Int. Cl.[7] .................................................. B23K 7/08
[52] U.S. Cl. .............................. 266/44; 266/49; 266/275; 266/276; 266/274
[58] Field of Search ................................ 266/49, 48, 274, 266/275, 276, 44; 432/261

[56] References Cited

U.S. PATENT DOCUMENTS

| 3,179,393 | 4/1965 | Bixby ........................................ 432/261 |
| 4,162,060 | 7/1979 | Anderson et al. ......................... 266/49 |
| 4,220,318 | 9/1980 | Anderson et al. ......................... 266/49 |
| 4,453,702 | 6/1984 | Anderson et al. ......................... 266/49 |
| 4,673,103 | 6/1987 | Anderson et al. ....................... 221/186 |
| 4,776,571 | 10/1988 | Lougee ....................................... 266/49 |
| 4,986,515 | 1/1991 | Anderson ................................... 266/49 |
| 5,013,884 | 5/1991 | Hahn .................................. 219/121.48 |
| 5,167,903 | 12/1992 | Anderson ................................... 266/49 |
| 5,511,764 | 4/1996 | Wonsetler .................................. 266/49 |

Primary Examiner—Scott Kastler
Attorney, Agent, or Firm—Webb Ziesenheim Logsdon Orkin & Hanson, P.C.

[57] ABSTRACT

An in-line material handling system wherein workpieces (P) are transported through the system in pallet baskets (10). The handling system includes a loading station (55, 208) a processing station (84, 210) for treating the workpieces (P) and a discharge station (124, 212) for receiving the treated workpieces (P) from the processing station (84, 210).

12 Claims, 18 Drawing Sheets

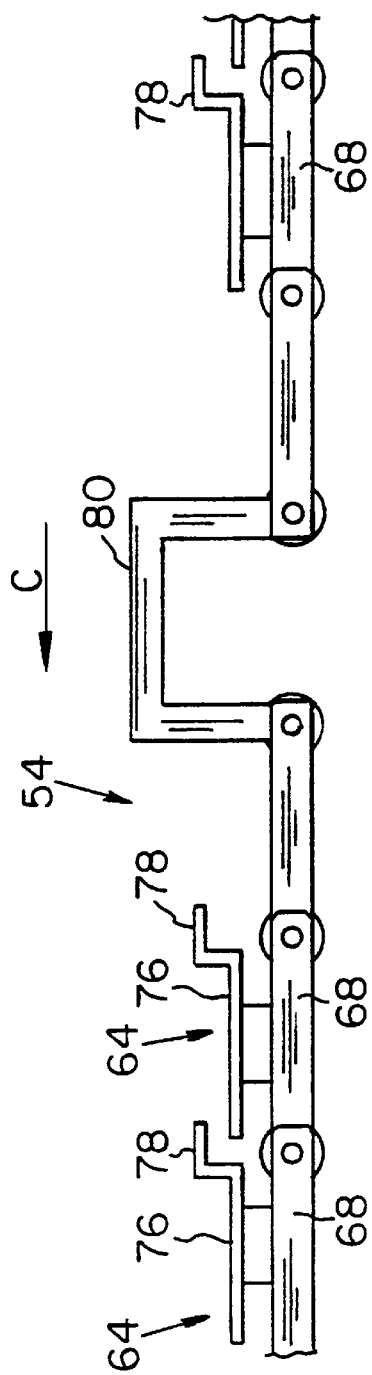
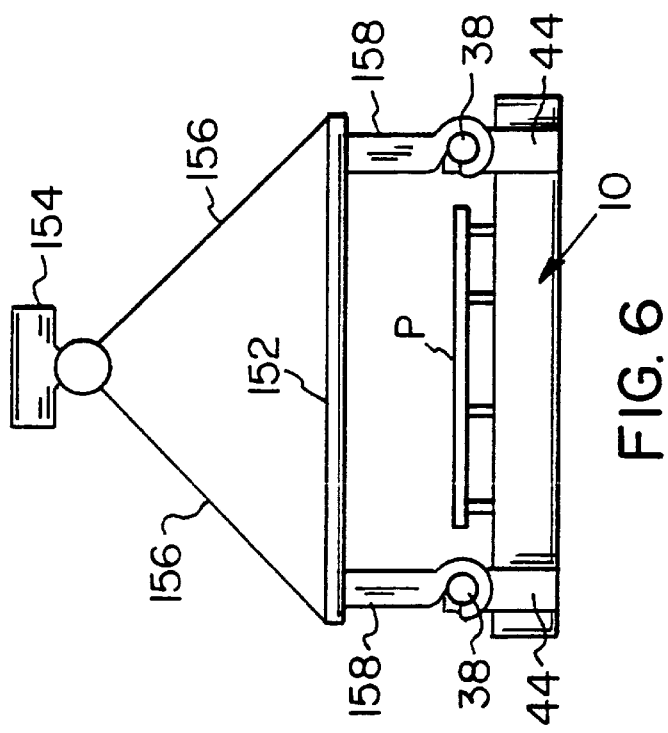
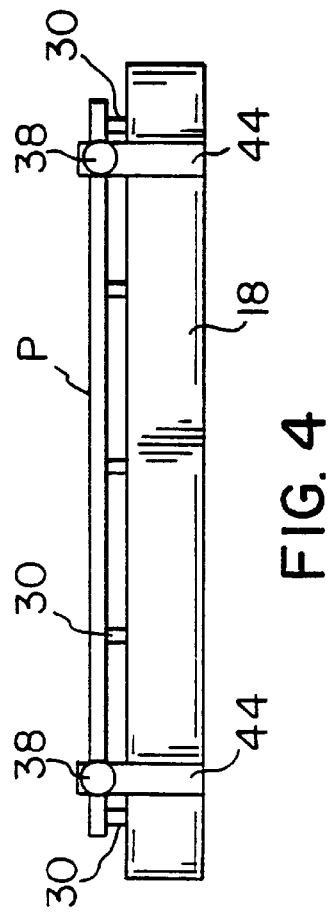
FIG. 5
FIG. 6
FIG. 4

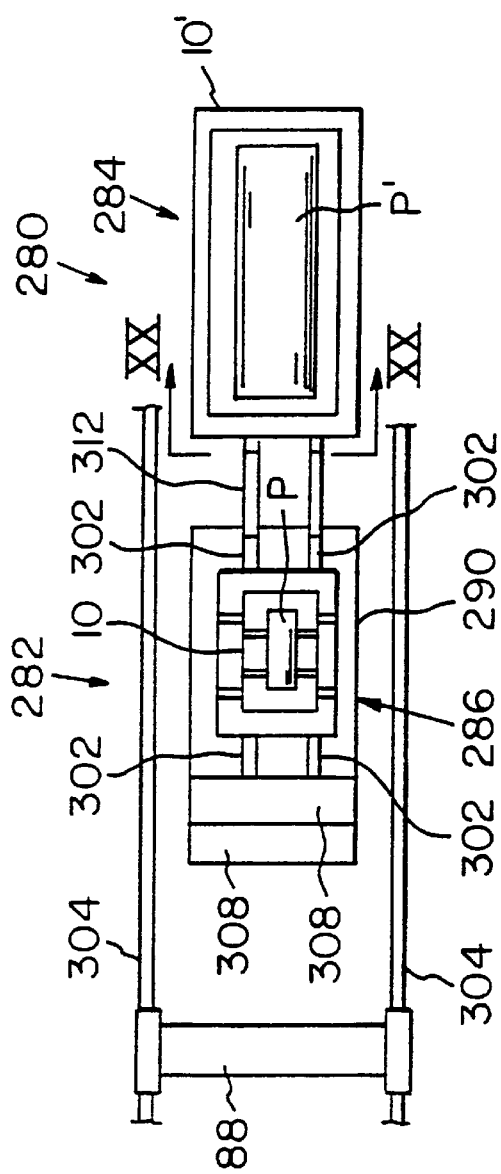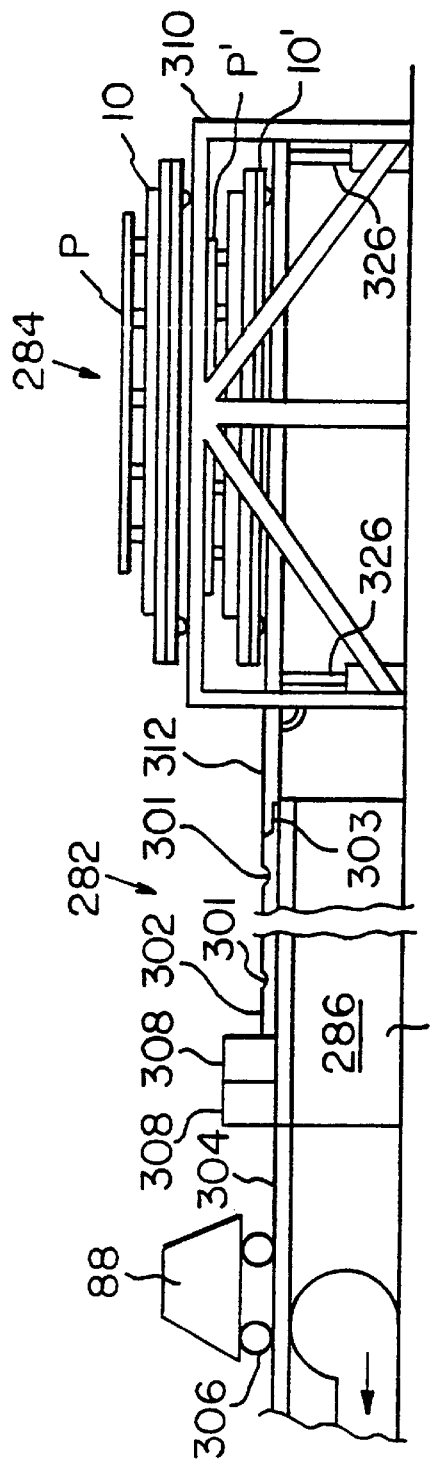

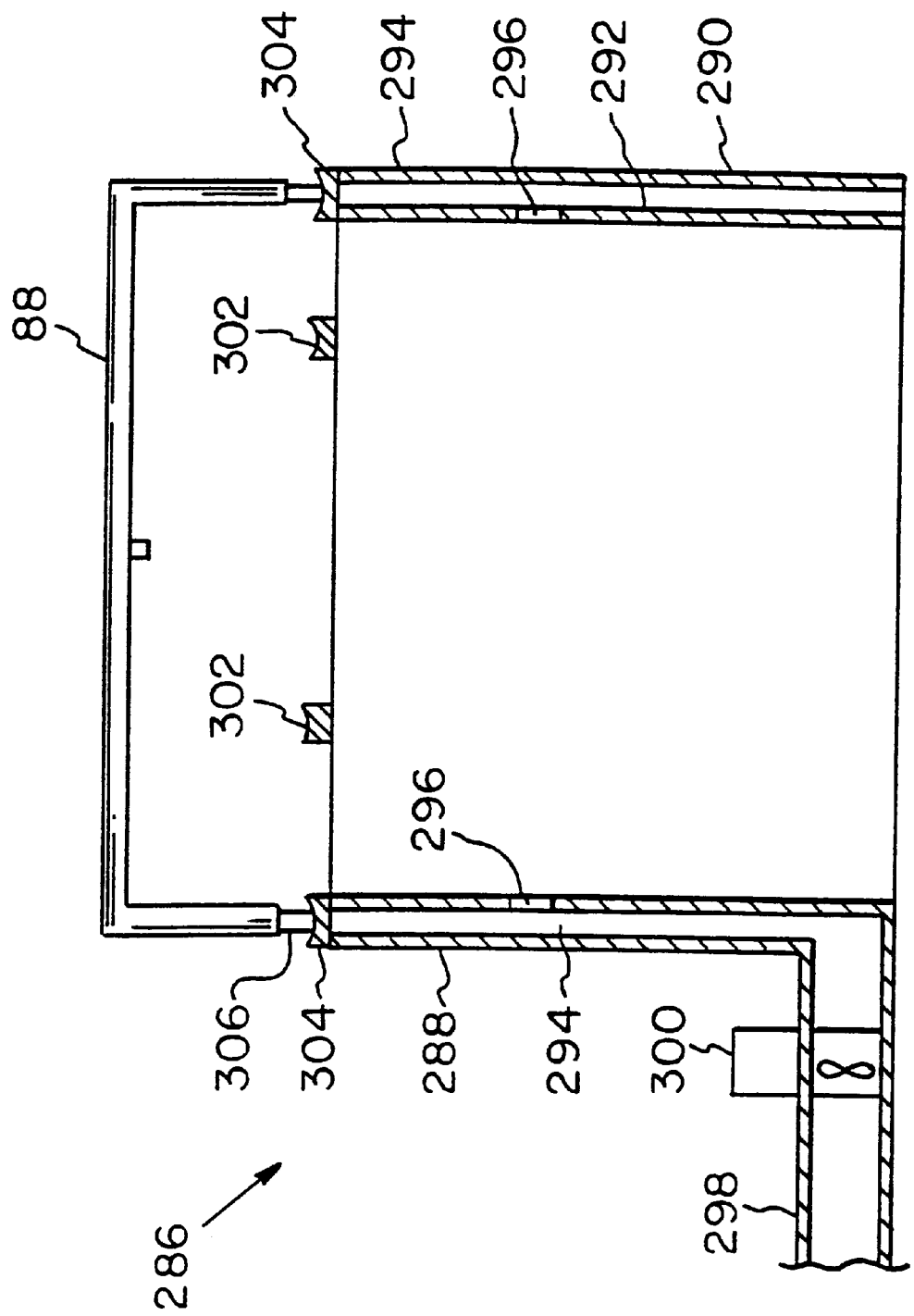

IN-LINE MATERIAL HANDLING SYSTEM WITH PALLET BASKETS

BACKGROUND OF THE INVENTION

1. Field of the Invention

The invention relates generally to an in-line material handling system and, more particularly, to an in-line material handling system wherein workpieces are transported through the system in pallet baskets.

2. Background of the Invention

When cutting a workpiece, such as a metal plate, with either a plasma arc or an oxy fuel torch, it is known to use a cutting station having a water table with a water bath having an adjustable level. The plate to be cut is immersed in the water bath or positioned above the surface of the water bath so that during the cutting operation, the cut pieces and skeletal remains of the plate are supported above the water bath while the swarf and dross produced during the cutting operation fall into, and are quenched by, the water in the water bath. For such cutting operations, it is also advantageous to use an in-line material handling system to transport the metal plate to and from the cutting station in order to minimize the time required to transport the plate between the stations in the system.

An in-line material handling system having a water table is disclosed in U.S. Pat. No. 4,220,318, the disclosures of which are incorporated herein by reference. In that patent, the metal plate or workpiece to be cut is loaded directly onto the rollers of a first conveyor and is transported onto a second conveyor. The second conveyor includes a number of continuous chains formed by links which are driven by an electric gear motor over sprockets mounted at opposite ends of the conveyor. A series of burning bars are carried on guard elements mounted directly on the links of the chains and the metal plate rests directly on the upper edges of the burning bars on the second conveyor. The guard elements form a channel which is designed to collect slag and dross produced during the cutting operation. When the second conveyor advances to the downstream end of the system, the slag collected in the channels of the guard elements is dumped into a waste container. The second conveyor serves as both a supporting conveyor for the plate during the cutting operation and as an off-loading conveyor.

A cutting station is positioned along the second conveyor and a conventional "bridge" type cutting machine extends over the sides of the second conveyor at the cutting station. A water table having a water tank which provides a water bath is located below the cutting machine. The water table includes sealing elements in the form of doors which, in a retracted position, allow the second conveyor to move freely through the water table beneath the cutting machine. When the plate to be cut is in position under the cutting machine, sealing elements are engaged to seal against the ends of the water tank of the water table so that the water in the water tank can be raised to a predetermined level appropriate to the metal being cut.

After a first metal plate has been cut at the cutting station, the water level in the water tank is lowered to a predetermined low position and the sealing elements are retracted. The second conveyor is then used to transport the cut pieces and metal skeleton produced from the first metal plate, which are resting directly on top of the burning bars of the second conveyor, to an off-loading station while at the same time indexing a new metal plate into position on the cutting station to be cut. When the new metal plate is in position at the cutting station, the second conveyor is stopped, the sealing elements are engaged, the water level in the water tank is adjusted and cutting is begun on the new metal plate. While the new metal plate is cut, the cut pieces and the metal skeleton from the first metal plate are individually removed from the top of the second conveyor at an off-loading station.

The cut pieces at the off-loading station generally consist of a number of individual metal pieces having a variety of shapes and sizes. Removing these cut pieces is a tedious and time consuming step which usually requires much more time than the time required to cut a plate at the cutting station. Therefore, it is not uncommon that pieces from a previously cut plate are still being off loaded from the second conveyor at the off-loading station when the cutting of the plate at the cutting station is completed. Thus, the second conveyor cannot be indexed forward to transport the cut plate out of the cutting station and transport another plate into the cutting station. This results in the loss of valuable cutting time while the cutting station is idle due to the time required to complete the off loading of the cut pieces and metal skeleton from the previously cut plate at the off-loading station. This loss of cutting time in the prior art cutting systems is undesirable lost production. Further lost production occurs due to the time required to separate poorly cut pieces, to repair and replace burning bars attached to the second conveyor and for multiple handling of cut parts and scrap. In the prior art handling systems, the off loading of the cut metal pieces from the second conveyor is the time controlling function in the operation of the overall system.

In addition, current plasma cutting technology utilizes oxygen which makes it attractive to cut a metal plate in the atmosphere in some situations. However, cutting plates in the atmosphere in the prior art cutting system produced large volumes of smoke and fumes. The smoke and fumes irritates workers near the cutting station and also creates a respiratory hazard away from the cutting station. Further, the Environmental Protection Agency requirements for the treatment of processed water are becoming more and more stringent and the cost of treating the water discharged from the water tank is expensive. Hence, a need for fume collection and air handling/filtration in cutting systems has developed as well as a need to effectively treat the water used in the water bath to remove the contaminants produced during the cutting operation.

Therefore, it is an object of the present invention to provide a device for quickly and efficiently off loading both cut pieces and skeletal remains from an in-line material handling system to increase the available cutting time of the system. It is a further object of the present invention to provide a pallet basket which can be used to quickly on load a workpiece onto the in-line material handling system and carry the workpiece and/or cut pieces of the workpiece through the entire in-line handling system. It is also an object of the invention to provide an improved in-line material handling system in which reusable pallet baskets are used to carry the workpiece and/or cut parts through the handling system. It is a further object of the invention to provide an in-line handling system in which the pallet baskets carrying the workpieces are moved through the handling system in carts. It is an additional object of the invention to provide a modified processing station for an in-line handling system which assists in the removal of smoke and fumes generated during atmospheric cutting of a workpiece at the processing station.

SUMMARY OF THE INVENTION

An in-line material handling system of the present invention for processing a workpiece includes means for supporting the workpiece during processing, a loading station, a processing station for treating the workpiece and a discharge station for receiving the treated workpiece from the processing station. A processing conveyor passes through the processing station and the discharge station. The system further includes means for transporting the workpiece onto the processing conveyor and means for removing the workpiece from the discharge station.

A method for transporting a workpiece from a first location to a second location in an in-line material system according to the present invention includes the steps of loading the workpiece in a first pallet basket, placing the loaded pallet basket onto a first conveyor at a loading station and moving the loaded pallet basket from the loading station onto a second conveyor which passes through the processing station. The method further includes moving the loaded pallet basket to the processing station, processing the workpiece at the processing station, moving the loaded pallet basket and the processed workpiece located therein from the processing station to a discharge station and removing the loaded pallet basket and the processed workpiece located therein from the second conveyor at the discharge station.

A processing station for an in-line material handling system according to the present invention includes at least one processing station wall having an inner surface and a water table assembly having a water tank with an outer surface spaced from the inner surface of the processing station wall to form a gap therebetween. An air duct is in flow communication with the gap. A positive displacement fan is in flow communication with the air duct, whereby air is forced through the gap between the walls.

A material handling system of the present invention for processing the workpiece includes means for supporting the workpiece during processing, a loading station, a processing station for treating the workpiece, a discharge station and means for transporting the workpiece between the loading station, the processing station and the discharge station.

A material handling system of the present invention for processing a workpiece includes a loading station having a pair of substantially parallel loading station rails and a processing station having a water tank with a vertically movable internal chamber having a top. The internal chamber has a pair of substantially parallel processing station rails mounted on the top of the internal chamber. The handling system further includes a discharge station having a pair of substantially parallel discharge station rails, a pair of pivotally mounted loading gate rails adapted to extend between the loading station and the processing station and a pair of pivotally mounted discharge gate rails adapted to extend between the discharge station and the processing station.

A method according to the present invention for transporting a workpiece from a first location to a second location in a material handling system including a processing station and a discharge station includes the steps of placing the workpiece in a pallet basket, locating the pallet basket and the workpiece carried therein onto the handling system at a loading station, moving the pallet basket and the workpiece carried therein from the loading station to the processing station, processing the workpiece at the processing station, moving the pallet basket and the processed workpiece from the processing station to the discharge station and removing the pallet basket and the processed workpiece from the discharge station.

A pallet basket for holding a workpiece according to the present invention includes a frame having a mesh bottom and at least one burning bar removably carried in the frame.

A complete understanding of the invention will be obtained from the following description when taken in connection with the accompanying drawing figures wherein like reference characters identify like parts throughout.

BRIEF DESCRIPTION OF THE DRAWINGS

FIG. 4 is an elevation of the pallet basket shown in FIG. 1 with a metal plate supported on the burning bars;

FIG. 5 is a side view of the conveyor structure of the processing conveyor shown in FIGS. 7 and 8;

FIG. 6 is an elevation of the pallet basket shown in FIGS. 1–4 connected to a lifting frame of an overhead crane;

FIG. 17 is a schematic plan view of another embodiment of an in-line material handling system according to the invention;

FIG. 18 is an elevation of the system shown in FIG. 17 showing a cart support rack in the upper position;

FIG. 23 is a section on line XXIII—XXIII of FIG. 22.

DESCRIPTION OF THE PREFERRED EMBODIMENTS

Figure 1:
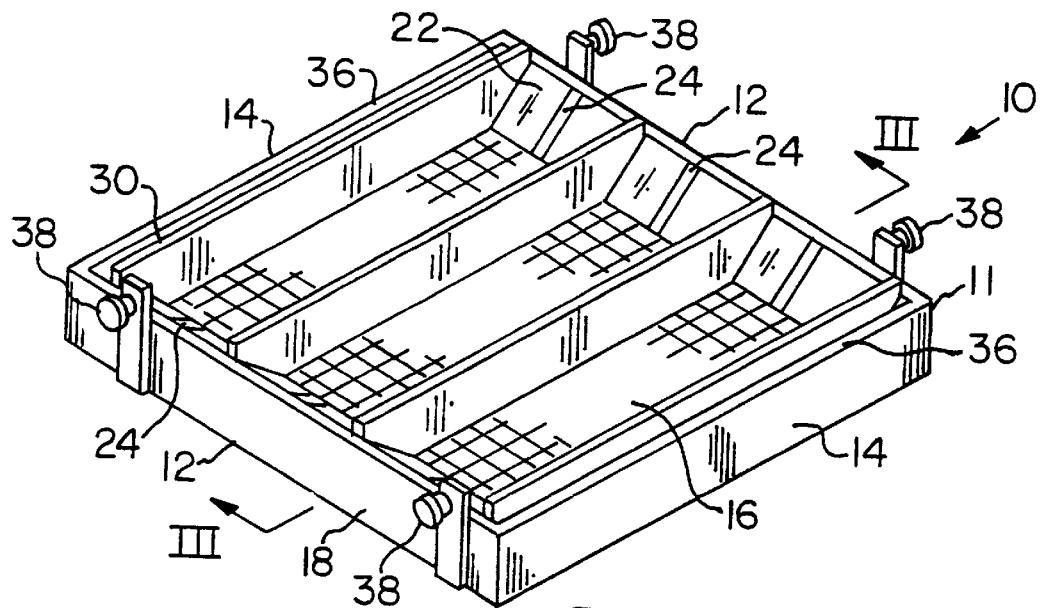
FIG. 1 is an isometric view of a pallet basket according to the present invention.

For purposes of the description hereinafter, the terms "upper", "lower", "right", "left", "rear", "front", "vertical", "horizontal" and derivatives thereof shall relate to the invention as it is oriented in the drawing figures. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state to the contrary.

Figure 2:
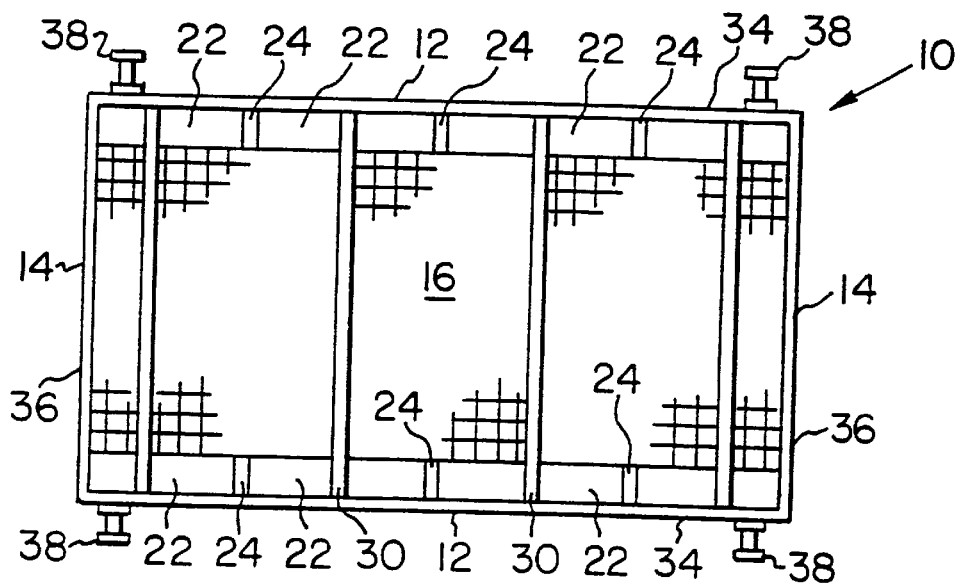
FIG. 2 is a plan view of the pallet basket shown in FIG. 1.
Figure 3:
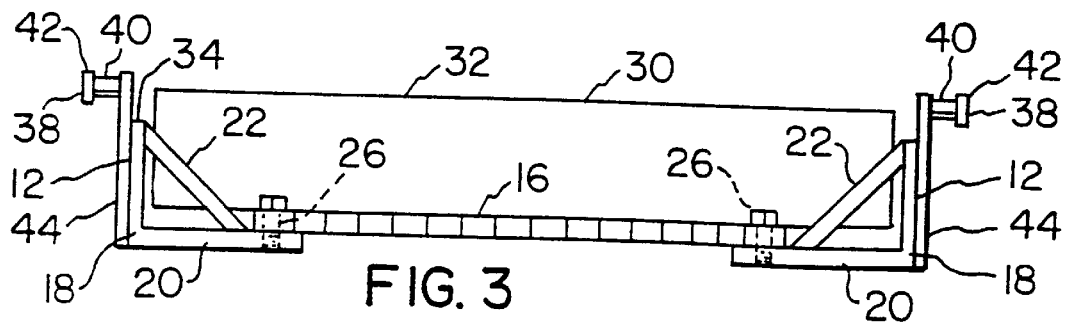
FIG. 3 is a section on line III—III of FIG. 1.

A pallet basket in accordance with the present invention is generally designated 10 throughout the drawings. As shown in FIGS. 1–4 of the drawings, the pallet basket 10 comprises a substantially rectangular box-like frame 11 having opposed side supports 12, end supports 14 and an open mesh bottom 16. As shown in FIG. 3 of the drawings, the side supports 12 have a vertical leg 18 and a horizontal leg 20 which are connected at a substantially right angle to each other. The end supports 14 are connected to the side supports 12 by welding or other conventional methods to form the rigid box-like frame 11.

As shown in FIGS. 1 and 3 of the drawings, a plurality of individually spaced metal plates 22 are positioned at an inwardly sloping angle of about 30°–45° between the vertical leg 18 and the horizontal leg 20 of each side support 12. The plates 22 are permanently connected to the side supports 12 by welding or other conventional methods. The ends of adjacent plates 22 are spaced from each other such that a gap or slot 24 is formed therebetween. As shown in FIG. 2 of the drawings, each side support 12 has a plurality of spaced slots 24 extending along its length, with the slots 24 on one side support located substantially opposite to the slots 24 on the opposed side support. The mesh bottom 16 is connected to the horizontal legs 20 of the side supports 12 by sheet metal screws 26 or other conventional attaching means. In the preferred embodiment, the side supports 12 and the end supports 14 are constructed of angle iron and the mesh bottom 16 is a steel mesh screen.

As shown in FIGS. 1, 2 and 4 of the drawings, a plurality of support bars or burning bars 30 are removably mounted in the pallet basket 10 by sliding the ends of the burning bars 30 into the opposed slots 24 formed in the side supports 12. As shown in FIGS. 3 and 4 of the drawings, the height of the burning bars 30 is such that the upper support edge 32 of each burning bar 30 extends above the upper edges 34 of the vertical legs 18 of the side supports 12 and the upper edges 36 of the end supports 14. While the burning bars 30 shown in FIGS. 1–4 of the drawings have substantially flat upper edges, burning bars having an upper edge with a different shape, such as those disclosed in U.S. Pat. No. 5,167,903, the disclosures of which are incorporated herein by reference, can also be used.

Four lifting members, such as lugs 38, are attached to the outer surface of the vertical legs 18 of the side supports 12. Each lifting lug 38 includes a substantially cylindrical body 40 and an outer flange 42 having a diameter larger than the diameter of the body 40. Each lifting lug 38 is preferably attached to a metal lifting lug plate 44 which is in turn attached by conventional methods, such as welding, to the outer surface of a vertical leg 18 of a side support 12. While lifting lugs 38 are used in the preferred embodiment of the invention, it will be understood by those skilled in the art that alternative lifting connectors, such as eyes, ratchets, magnets and the like, could also be used.

Figure 7:
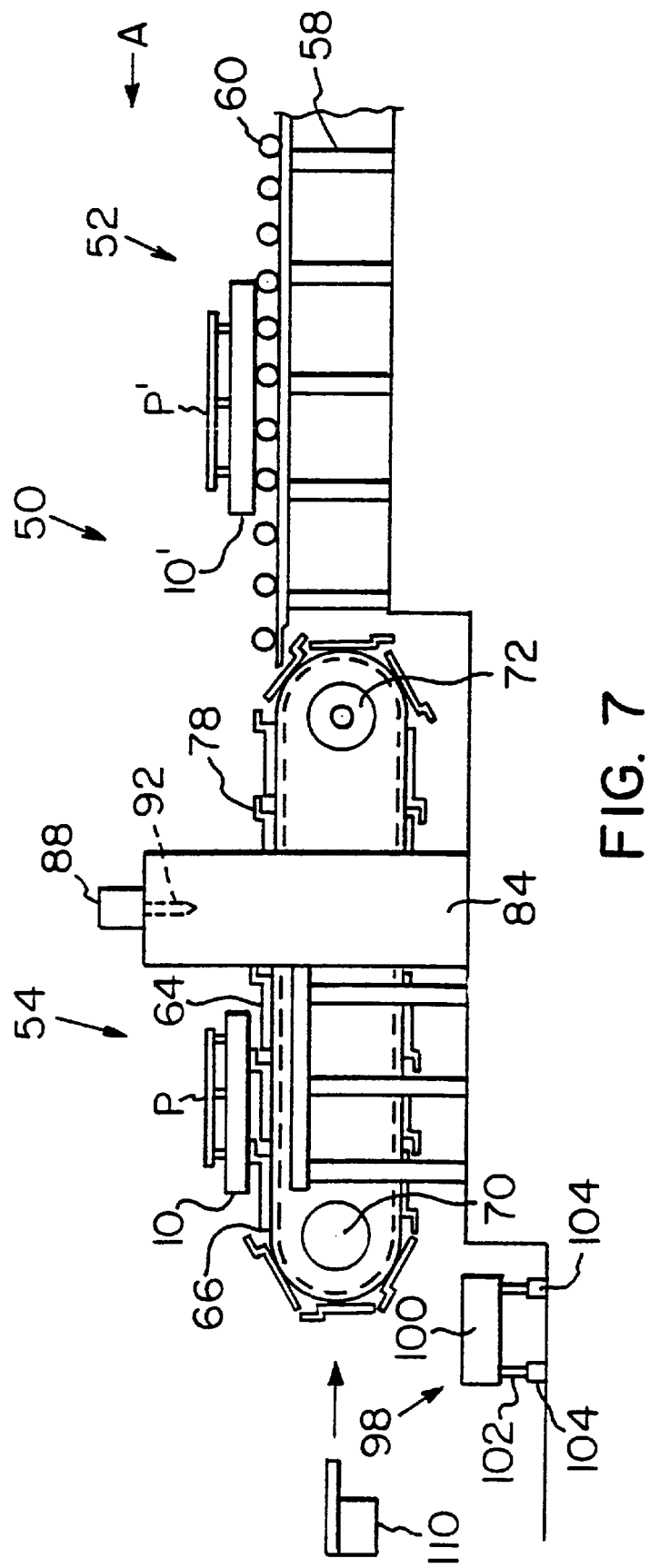
FIG. 7 is an elevation of a loading conveyor and a processing conveyor of the material handling system shown in FIG. 9.
Figure 8:
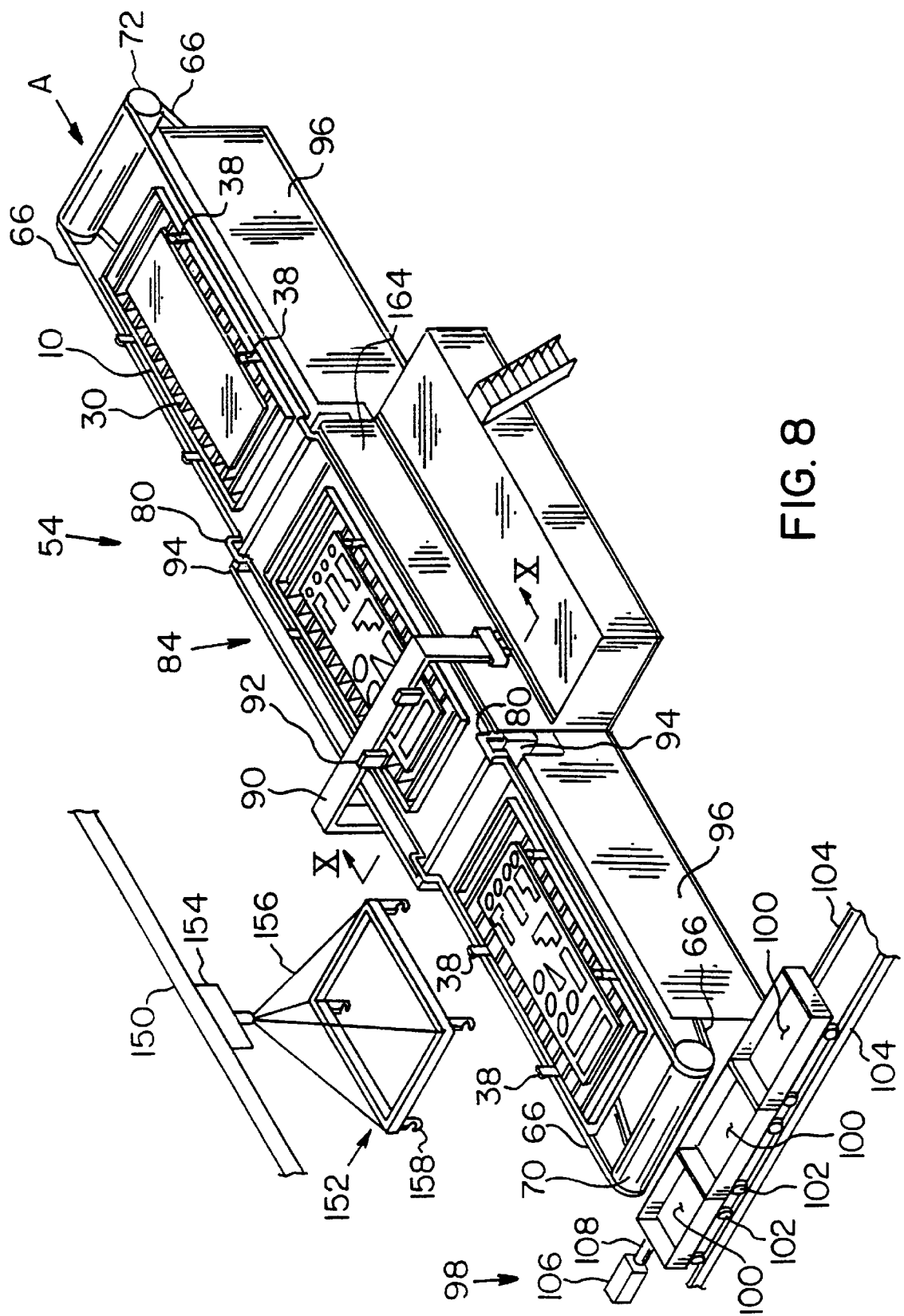
FIG. 8 is an isometric view of the conveyors of the in-line material handling system shown in FIG. 7.
Figure 9:
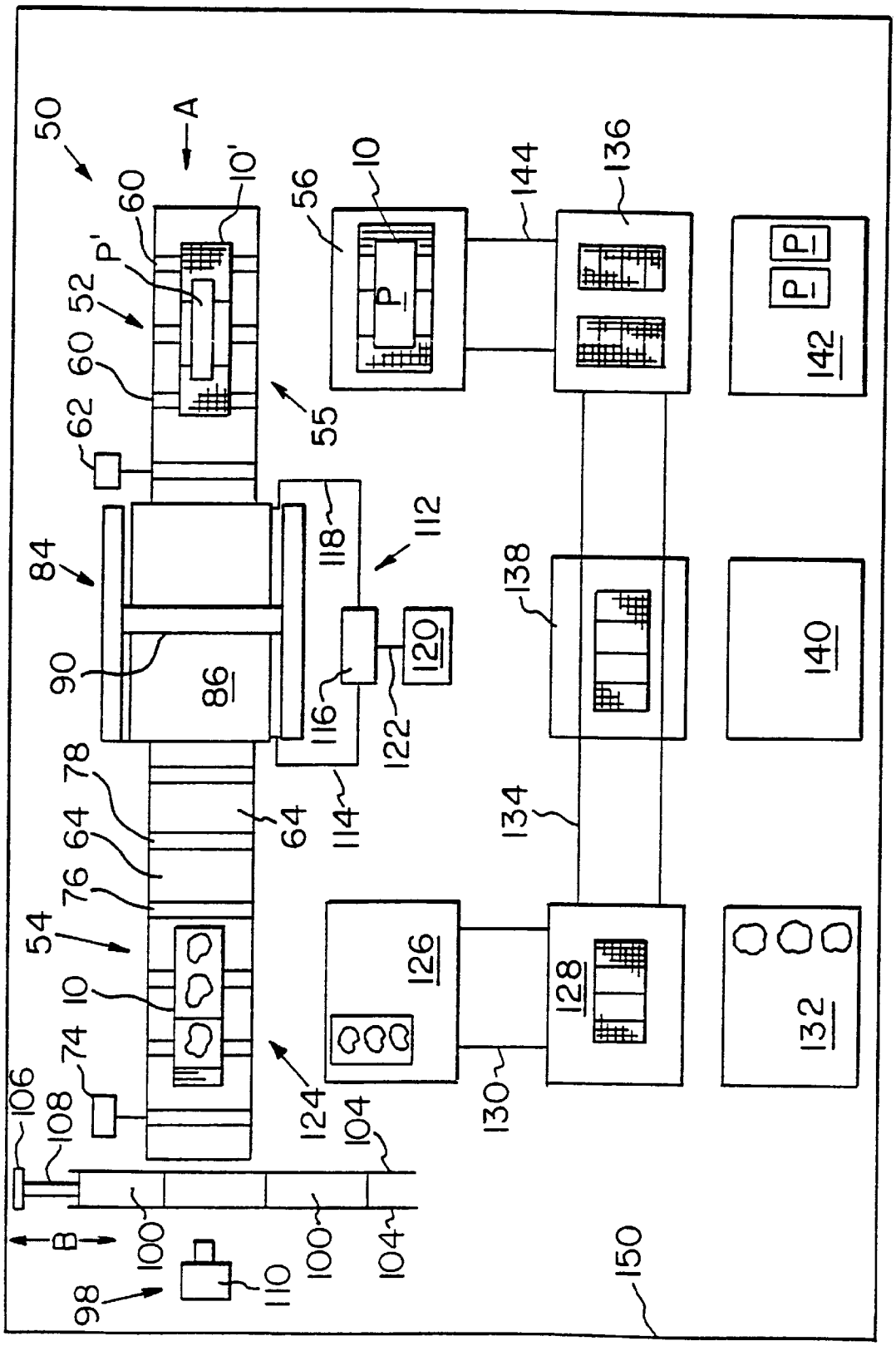
FIG. 9 is a schematic plan view of an in-line material handling system according to the invention.

An in-line material handling system according to the invention is generally designated 50 in FIGS. 7–9 of the drawings. The in-line handling system 50 is similar to the in-line material handling system disclosed in U.S. Pat. No. 4,220,318 but with modifications as discussed hereinbelow to accommodate the pallet baskets 10 of the invention.

As shown in FIGS. 7–9 of the drawings, the material handling system 50 preferably includes a loading or first conveyor 52 and a processing or second conveyor 54. The first and second conveyors 52 and 54 are aligned with each other so that a pallet basket 10 having a workpiece supported therein, such as a metal plate P, can be transported in the direction of the arrow A along the first and second conveyors 52 and 54. The first conveyor 52 includes a loading station 55 where pallet baskets are loaded onto the first conveyor 52. A workpiece holding area 56 is located adjacent to and upstream of the loading station 55 of the first conveyor 52. The first conveyor 52 is preferably a conventional heavy duty roller conveyor comprising vertical support members or stanchions 58 supporting lateral rollers 60 which are rotated in conventional manner by a motor 62.

As shown in FIGS. 5, 7 and 8 of the drawings, the second conveyor 54 preferably includes a plurality of conveyor trays 64 carried on continuous chains 66 having connected links 68 mounted on sprockets 70 and 72. The sprocket 70 is powered by a motor 74. As shown in FIGS. 5 and 7 of the drawings, each conveyor tray 64 of the second conveyor 54 has a substantially planar portion 76 and a rearwardly facing raised guard element 78 as defined with respect to the direction of movement of the second conveyor 54 which is shown by the arrow C. One end of the guard element 78 is connected to the planar portion 76 and the distal end of the guard element 78 overlies the forward end of the following conveyor tray 64. The guard element 78 prevents slag and dross produced during the cutting operation from falling between the adjacent trays 64 of the second conveyor 54. Each chain 66 of the second conveyor is provided with at least two U-shaped transition links 80 which are spaced along the chains 66 at appropriate distances to interact with the sealing elements of a water table as described in detail in U.S. Pat. No. 4,220,318.

With reference to FIGS. 8 and 9 of the drawings, a plate processing station 84 is located along the second conveyor 54. The processing station 84 includes a sealable water table assembly 86 having a water tank located under a conventional cutting apparatus 88. The cutting apparatus 88 spans the second conveyor 54 and includes a movable bridge 90 having at least one adjustable cutting torch 92 mounted thereon. The water table assembly 86 has adjustable sealing elements 94, such as doors, located at each end thereof. When the sealing elements 94 are retracted, the trays 64 of the second conveyor 54 freely pass through the water table assembly 86. In the raised or engaged position, the sealing elements 94 seal off the ends of the water table assembly 86 to permit the water level in the water table assembly 86 to be adjusted in a conventional manner such as disclosed, for example, in U.S. Pat. No. 4,220,318. However, the water table assembly 86 may be of any conventional type such that the trays 64 of the second conveyor 54 pass therethrough. As shown in FIG. 8 of the drawings, skirts or walls 96 are placed around the sides of the first conveyor 52, the second conveyor 54 and the processing station 84 as a safety practice to shield workers from the moving parts of the conveyors 52 and 54 and from the water table assembly 86.

A waste removal station 98 is located at the discharge end of the second conveyor 54. The waste removal station 98 includes a plurality of individual waste containers 100 having wheels 102 which ride on rails 104. A piston assembly 106 is provided having a movable piston rod 108 with its distal end operatively connected to the end of a waste container 100 such that movement of the piston rod 108 moves the waste container 100 forwardly or backwardly as shown by the arrows B in FIG. 5. Thus, a selected waste container 100 can be positioned under the discharge end of the second conveyor 54 for selective recovery of the swarf and dross present on the conveyor trays 64 of the second conveyor 54. A water spray assembly 110 is located at the waste removal station 98.

As shown in FIG. 9 of the drawings, a water filtration system 112 is in flow communication with the water in the interior of the water table assembly 86. An inlet pipe 114 extends between the water table assembly 86 and a water purification unit 116, such as a conventional clarifier/ centrifuge unit. An outlet pipe 118 extends between the purification unit 116 and the water table assembly 86. A receptacle 120 is in flow communication with the purification unit 116 via a discharge pipe 122.

As shown in FIG. 9 of the drawings, the second conveyor 54 includes a discharge station 124. A processed parts receiving area 126 is located adjacent to the second conveyor 54 downstream from the processing station 84. A parts unloading station 128 is located near the processed parts receiving area 126 and a conventional unloading conveyor 130 extends between the processed parts receiving area 126 and the unloading station 128. A finished parts storage area 132 is located near the unloading station 128. A well-known overhead servicing conveyor 134 is shown extending between the unloading station 128 and a pallet holding area 136 and extends through a pallet basket servicing area 138. A remnant storage area 140 is located near the servicing area 138 and a workpiece supply area 142 is located near the pallet holding area 136. A return conveyor 144 extends between the pallet holding area 136 and the workpiece holding area 56. The overhead servicing conveyor 134 is movable horizontally so that it can service all of the stations 128, 132, 136, 138, 140 and 142.

As shown in FIGS. 8 and 9 of the drawings, a conventional overhead crane system 150, such as a TRAMBEAM® system manufactured by the Whiting Corporation of Attalla, Alabama, is located above the material handling system 50. A pallet basket lifting frame 152 is attached to the crane system 150. The lifting frame 152 is substantially rectangular and is attached to a movable carriage 154 of the crane system 150 by steel cables 156 extending between each corner of the lifting frame 152 and the carriage 154. The crane system 150 can raise and lower the lifting frame 152 and can also move the lifting frame 152 horizontally throughout the area of the material handling system 50. Four lifting hooks 158 depend from the lifting frame 152. As shown in FIG. 6 of the drawings, each lifting hook 158 is configured to engage a lug 38 on the pallet basket 10 so that the crane system 150 can lift the pallet basket 10 onto and off of the conveyors 52 and 54 and/or move the pallet basket 10 from one location to another in the material handling system 50. Alternatively, the pallet basket 10 can be moved between locations in the material handling system 50 by the above-described conveyors or by conventional methods, such as pallet trucks, forklifts and other material handling equipment. While only one lifting frame 152 is shown in FIG. 6 of the drawings, in the preferred embodiment of the invention, the overhead crane system 150 includes a plurality of carriages 154 each with its own lifting frame 152. Further, although both the first and second conveyors 52 and 54 are used in the preferred embodiment of the invention, the second conveyor 54 can be used alone if the overhead crane system 150 is used to lift the pallet baskets 10 directly onto the second conveyor 54 upstream of the processing station 84.

While the preferred embodiment of the invention has a first conveyor 52 and a second conveyor 54 aligned in end to end relationship, in alternative embodiments, the first conveyor 52 may be removed and a single second (processing) conveyor 54 may be used. In this alternative embodiment, the loading station is located on the second conveyor 54 upstream of the processing station 84.

Figure 10:
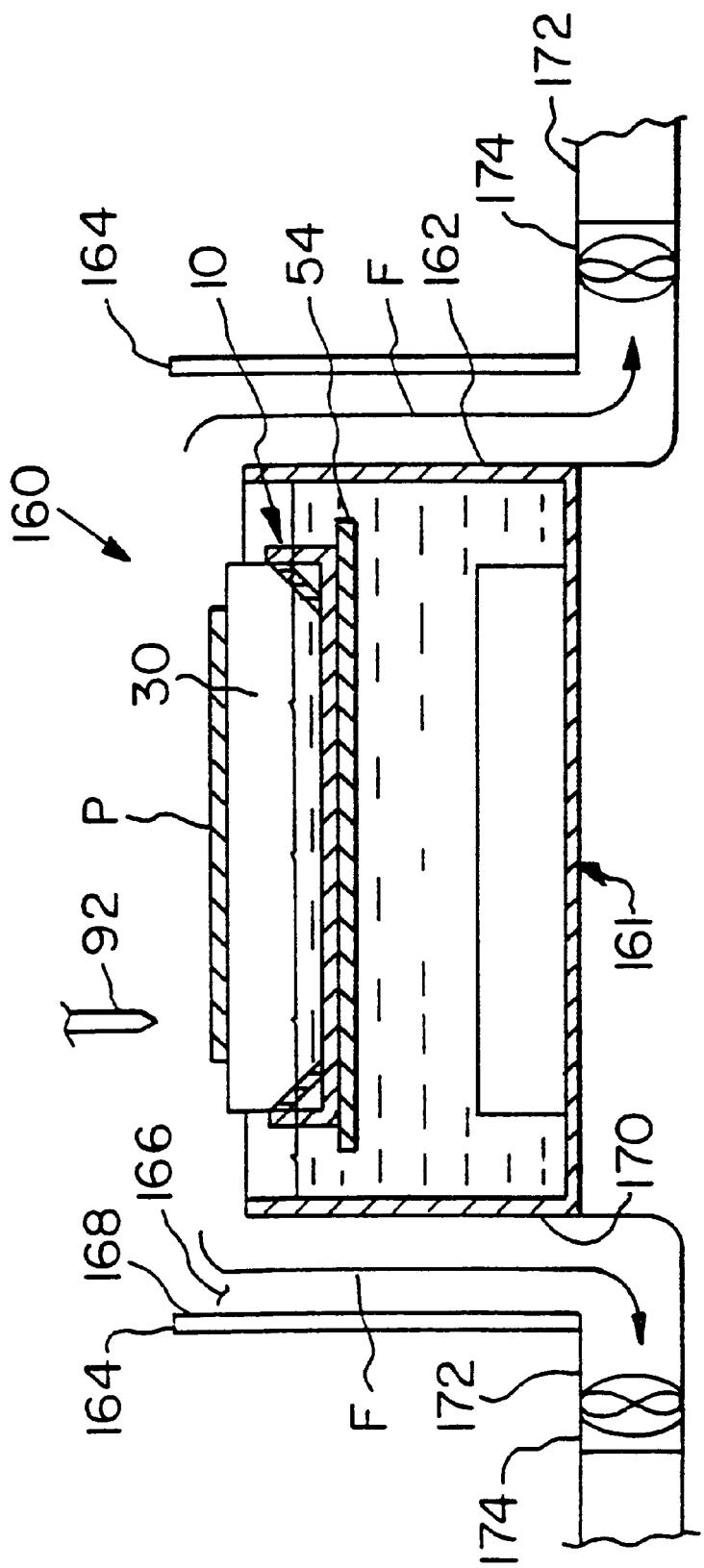
FIG. 10 is a partial vertical section of a processing station according to a second embodiment of the present invention.
Figure 11:
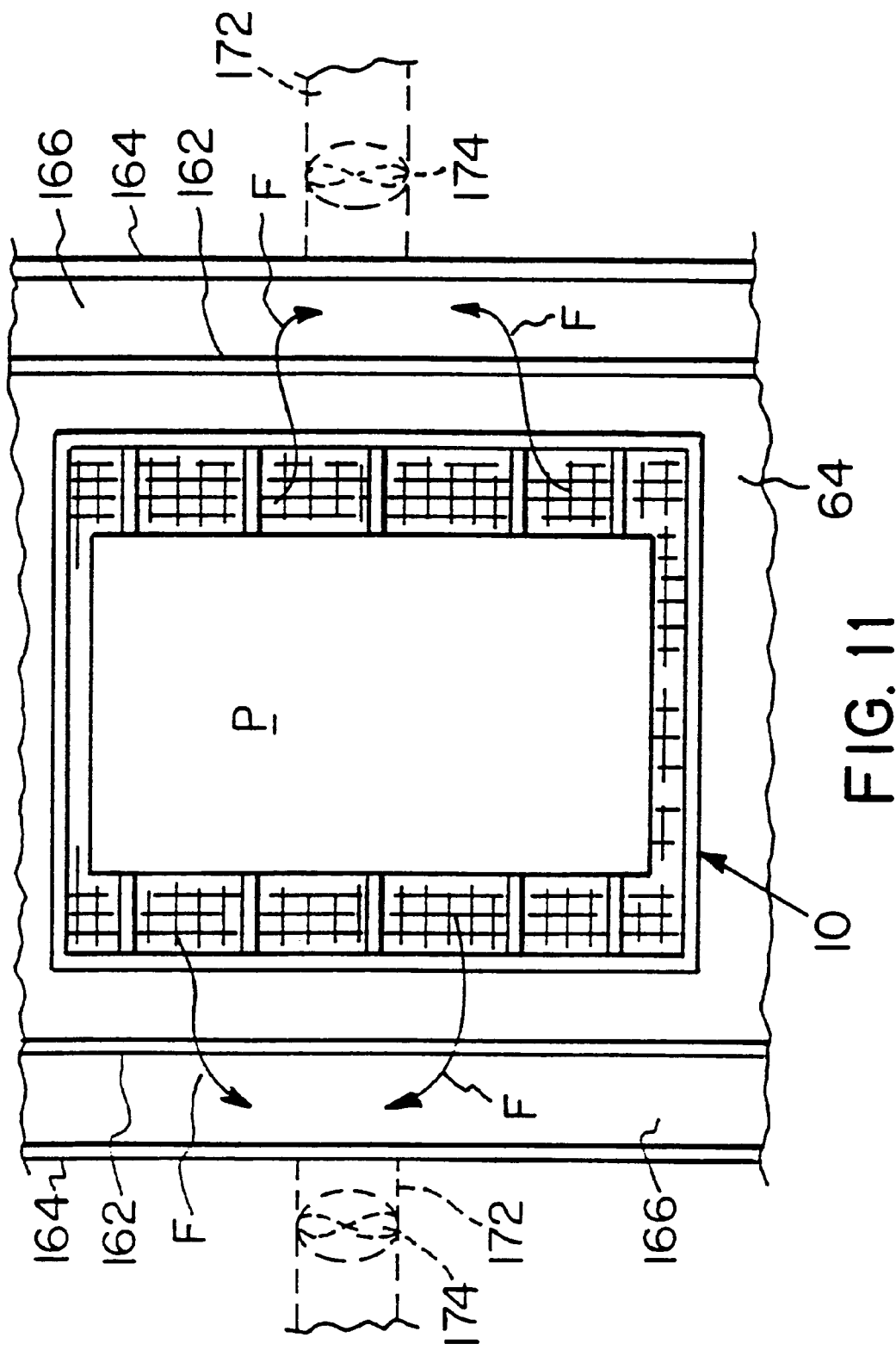
FIG. 11 is a plan view of the processing station shown in FIG. 10.

A modified processing station 160 according to the invention is shown in FIGS. 10 and 11 of the drawings. The modified processing station 160 can be used in place of the previously described processing station 84 and includes a water table having a water tank 161 through which the second conveyor 54 passes. The water tank 161 has spaced side walls 162 and end walls connected to the side walls. A pallet basket 10 supporting a metal plate P is carried on the second conveyor 54 as previously described. A wall 164 is located adjacent to each side wall 162 of the water tank 161. The walls 164 are spaced from the side walls 162 of the water tank 161 such that a gap 166 is formed on each side of the processing station 160 between an inner surface 168 of the wall 164 and an outer surface 170 of the side wall 162 of the water tank 161. A duct 172 having a fan 174 is positioned on each side of the processing station 160 and is in flow communication with the respective gaps 166 on each side of the processing station 160. Operation of the fans 174 removes fumes created during a cutting operation.

An alternative in-line material handling system 200 according to the invention is shown in FIGS. 12–15 of the drawings. The handling system 200 includes a pair of substantially parallel side-by-side processing lines 202 and 202' for processing workpieces. The processing lines 202 and 202' are structurally identical and therefore only processing line 202 is described in detail herein. The corresponding components of the processing line 202' shown in FIG. 12 of the drawings are designated with a prime ("'").

Figure 12:
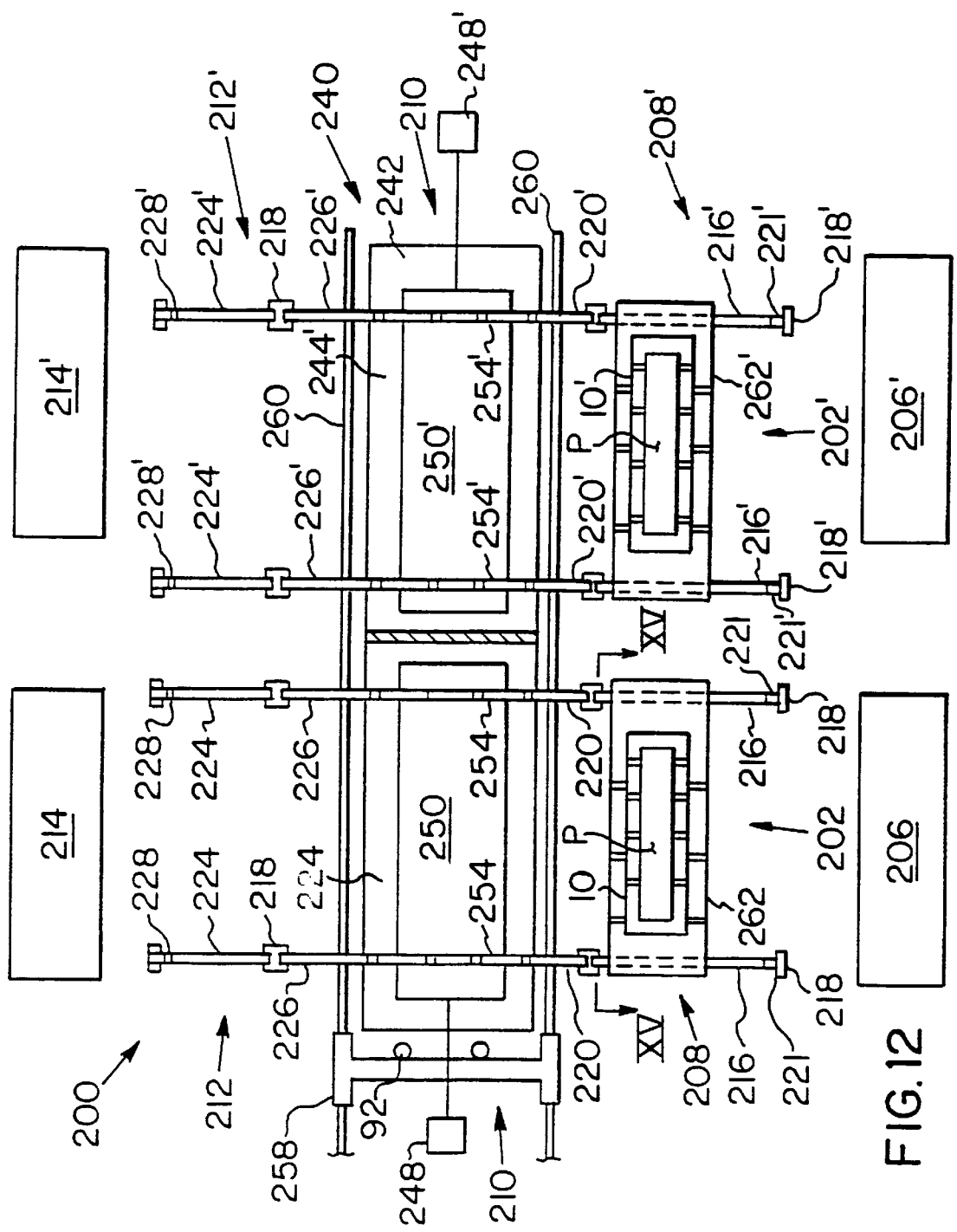
FIG. 12 is a schematic plan view of an alternative in-line material handling system according to the invention.
Figure 13:
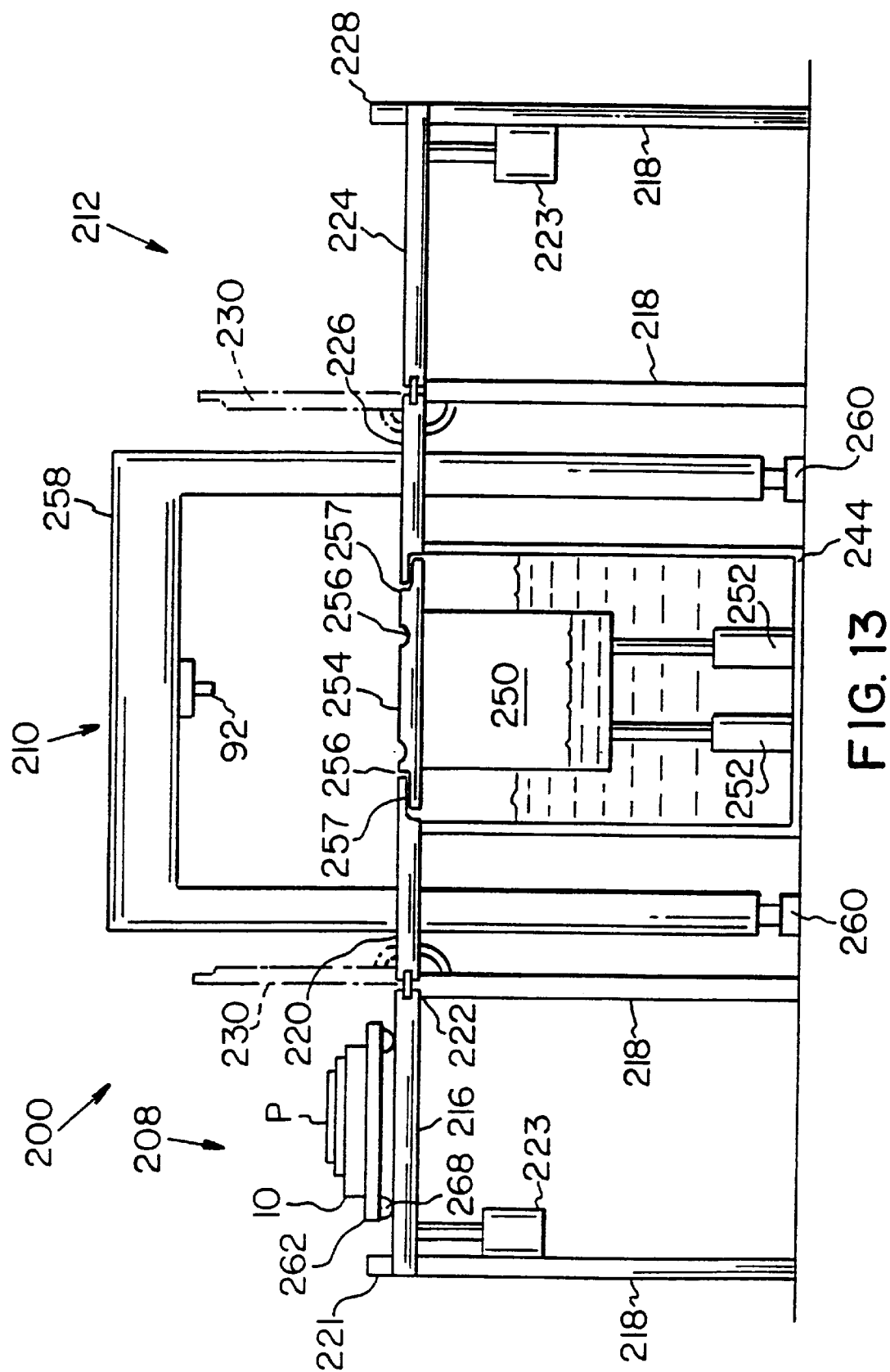
FIG. 13 is an elevation of the inlet end of the system shown in FIG. 12.

As shown in FIGS. 12 and 13 of the drawings, the processing line 202 includes a workpiece holding area 206, a loading station 208, a processing station 210, a discharge station 212 and a processed parts receiving area 214 which are aligned. The loading station 208 is located adjacent the workpiece holding area 206 and includes a pair of substantially parallel loading station rails 216 mounted on vertical support members 218. The loading station 208 further includes a pair of pivotally mounted loading gate rails 220 positioned at the ends of the loading station rails 216 adjacent to the processing station 210. The loading gate rails 220 are configured to pivot from a first or lower travel position aligned with the loading station rails 216, as shown in solid lines in FIG. 13, to a second or raised position substantially perpendicular to the loading station rails 216, as shown in dashed lines in FIG. 13. A stop 221 is located on the outer end of each loading station rail 216.

In one embodiment, the loading station rails are rigidly attached to the vertical support members 218 by conventional methods, such as welding. In an alternative embodiment, the inner end 222 of each loading station rail 216 is pivotally mounted to the support member 218 adjacent to the processing station 210 and the other end of the rail 216 rests on top of another support member 218. A lifting device, such as a hydraulic piston, 223 is positioned below the outer end of the rail 216, as shown in FIG. 13 of the drawings, to pivot the rail about its opposite end.

The discharge station 212 is structurally similar to the loading station 208 and includes a pair of substantially parallel discharge station rails 224 supported on vertical support members 218. The discharge station 212 further includes a pair of pivotally mounted discharge gate rails 226 positioned at the inner ends of the discharge station rails 224 adjacent to the processing station 210 and configured to pivot from a first or lowered position, shown in solid lines in FIG. 13, to a second or raised position, shown in dashed lines in FIG. 13. In the lowered position, the discharge gate rails 226 align with the discharge station rails 224. A stop 228 is located on an outer end of each discharge station rail 224. As shown in FIG. 13 of the drawings, the loading gate rails 220 and discharge gate rails 226 include notched ends 230.

In one embodiment, the inner end of each discharge station rail 224 is pivotally attached to the support member 218 adjacent to the discharge station 212 and a lifting device, such as a hydraulic piston, 223 is located below the outer end of the rail 226 to pivot the discharge rail about its opposite end.

As shown in FIG. 12 of the drawings, the processing stations 210 and 210' are positioned over an elongated water table assembly 240. The water table assembly 240 includes an elongated water tank 242 which can be divided into two individual water tanks 244 and 244' by a removable partition 246. Each water tank 244 and 244' has a water level control assembly 248 and 248' to control the level of the water in the respective water tanks 244 and 244'. An internal chamber 250 and 250' is located in each water tank 244 and 244'. Since the structure of each processing station 210 and 210' is identical, only station 210 is described in detail hereinafter.

The internal chamber 250 is supported on lifting elements 252, such as hydraulic cylinders resting on the bottom of the water tank 244. The lifting elements 252 are configured to vertically raise and lower the internal chamber 250. A pair of substantially parallel processing station rails 254 are attached to the top of the internal chamber 250 by conventional methods, such as welding. Each processing station rail 254 includes a pair of spaced positioning grooves 256 and notched ends 257. A conventional wheel mounted movable bridge-type cutting apparatus 258 having at least one movable cutting torch 92 is movably carried in a conventional manner on spaced rails 260 extending along the sides of the water tank 242 and located perpendicular to the processing station rails 254 and 254'.

Figure 14:
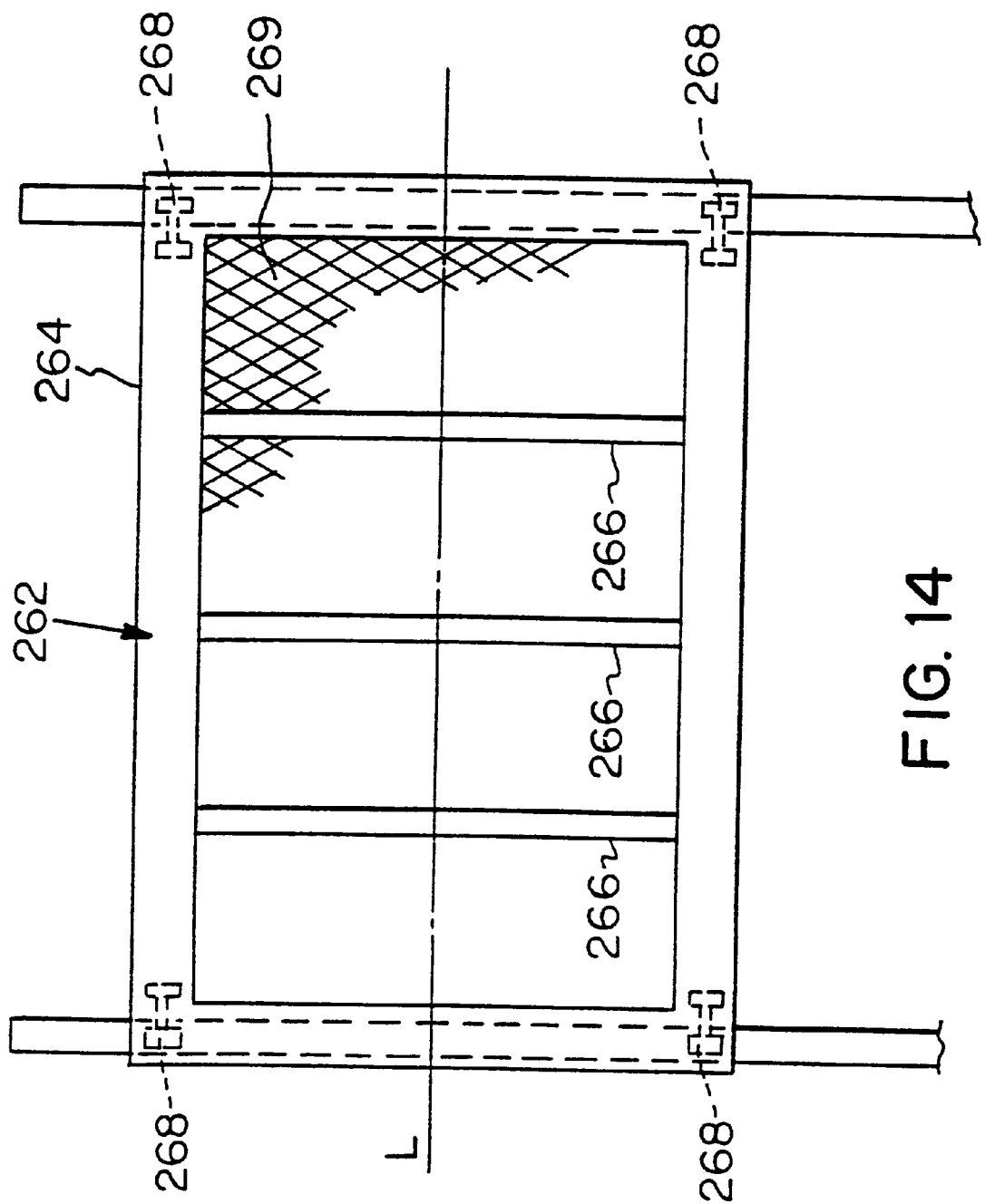
FIG. 14 is a plan view of a cart for use in the system shown in FIGS. 12 and 13.
Figure 15:
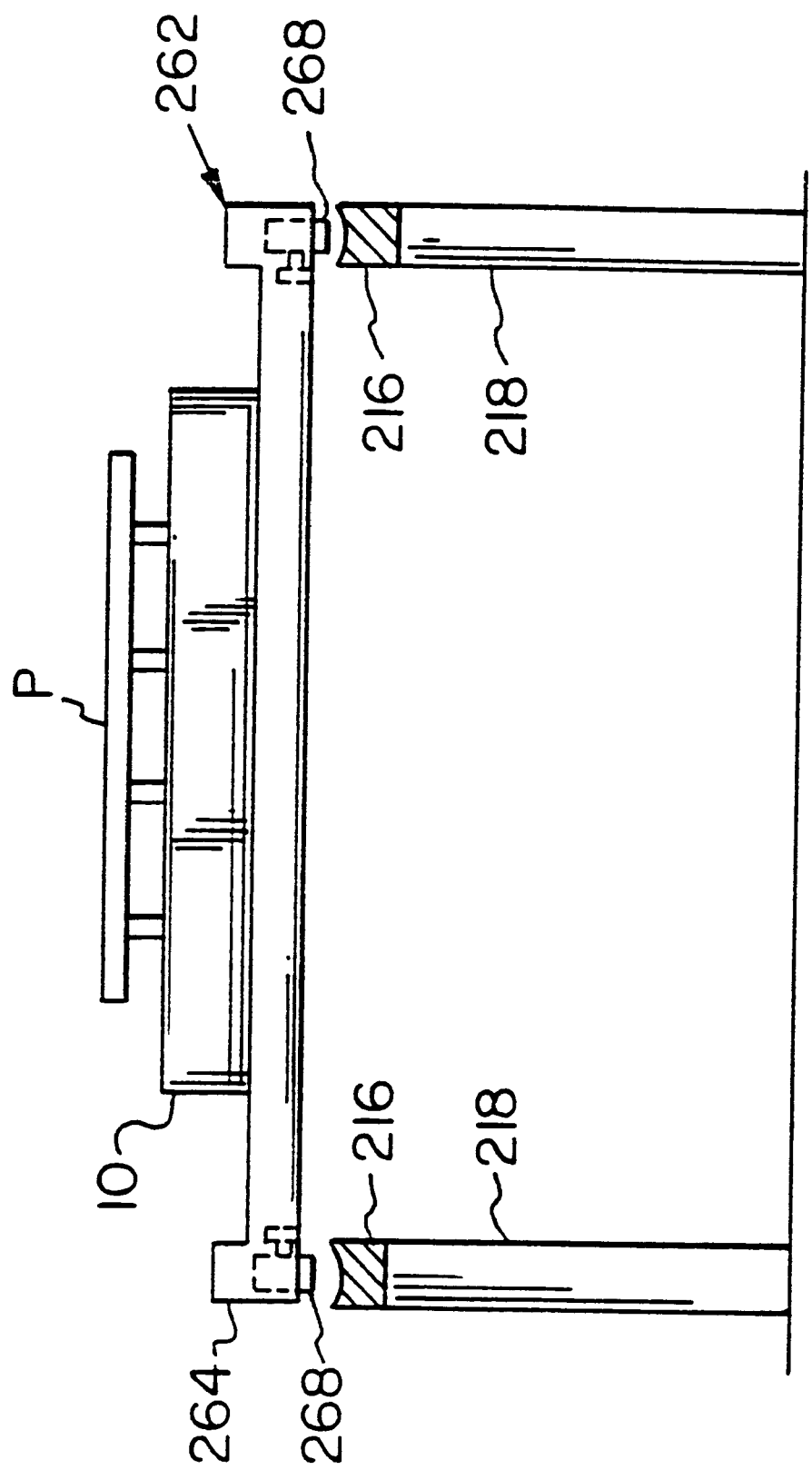
FIG. 15 is a section on line XV—XV of FIG. 12.

As shown in FIGS. 12–14 of the drawings, each processing line 202 and 202' includes identical wheeled carts 262 and 262'. As shown in FIGS. 13–15 of the drawings, cart 262 includes a substantially rectangular metal frame 264 having a plurality of spaced substantially parallel support cross members 266, wheels 268 rotatably mounted at each corner of the frame 264 and a mesh bottom 269, for example a one inch by two inch flat mesh screen is supported on the frame 264. The axis of rotation of the wheels is substantially parallel to a longitudinal axis L of the cart 262. The wheels 268 are configured to ride over the rails 216, 220, 254, 226 and 224 as described hereinafter.

Figure 16:
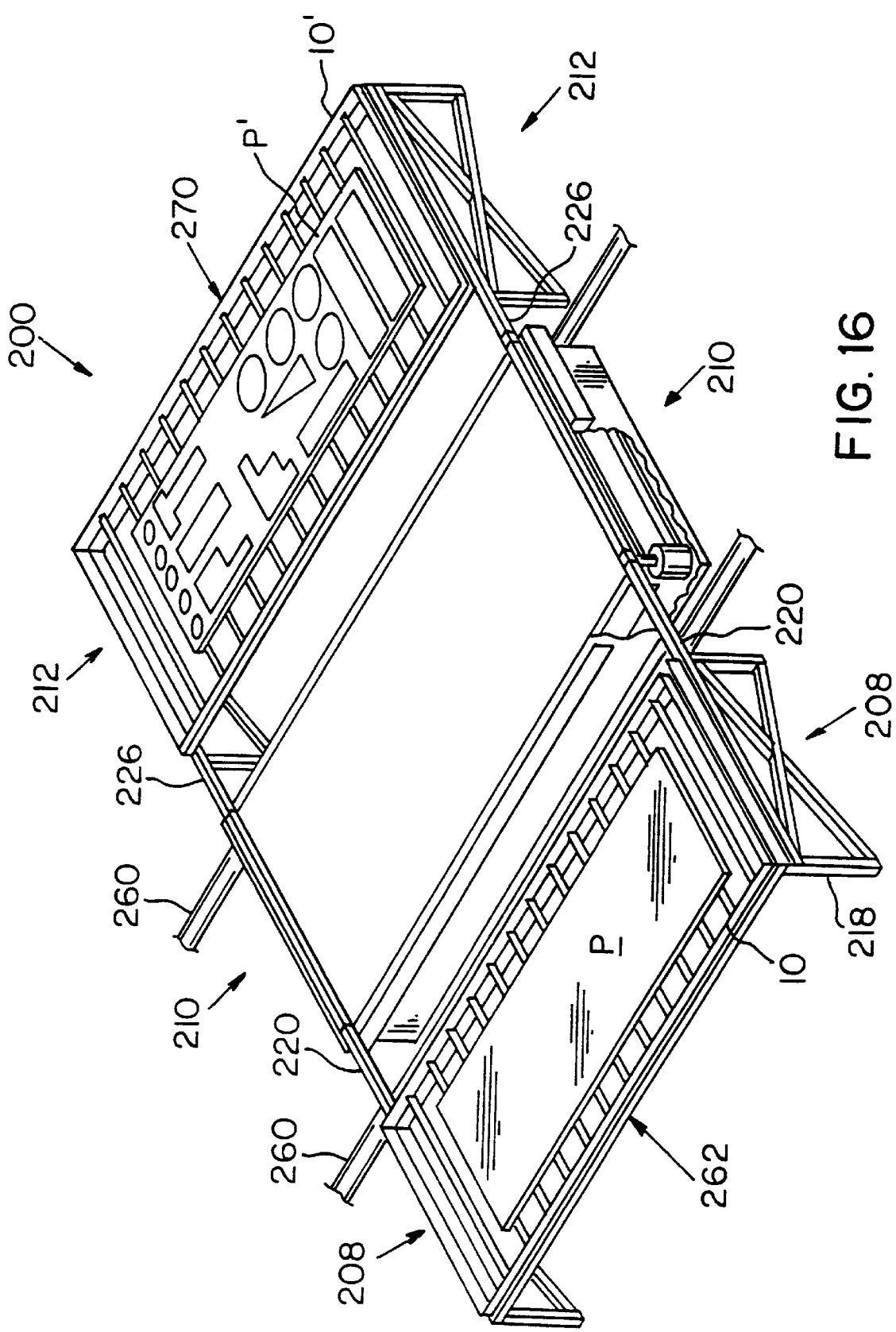
FIG. 16 is an isometric view of the system shown in FIG. 12.

A modified version of the processing line 202 is shown in FIG. 16 of the drawings. This modified processing line 202 is identical to that discussed above but includes a second cart 270. The operation of this modified line is explained hereinafter.

Figure 20:
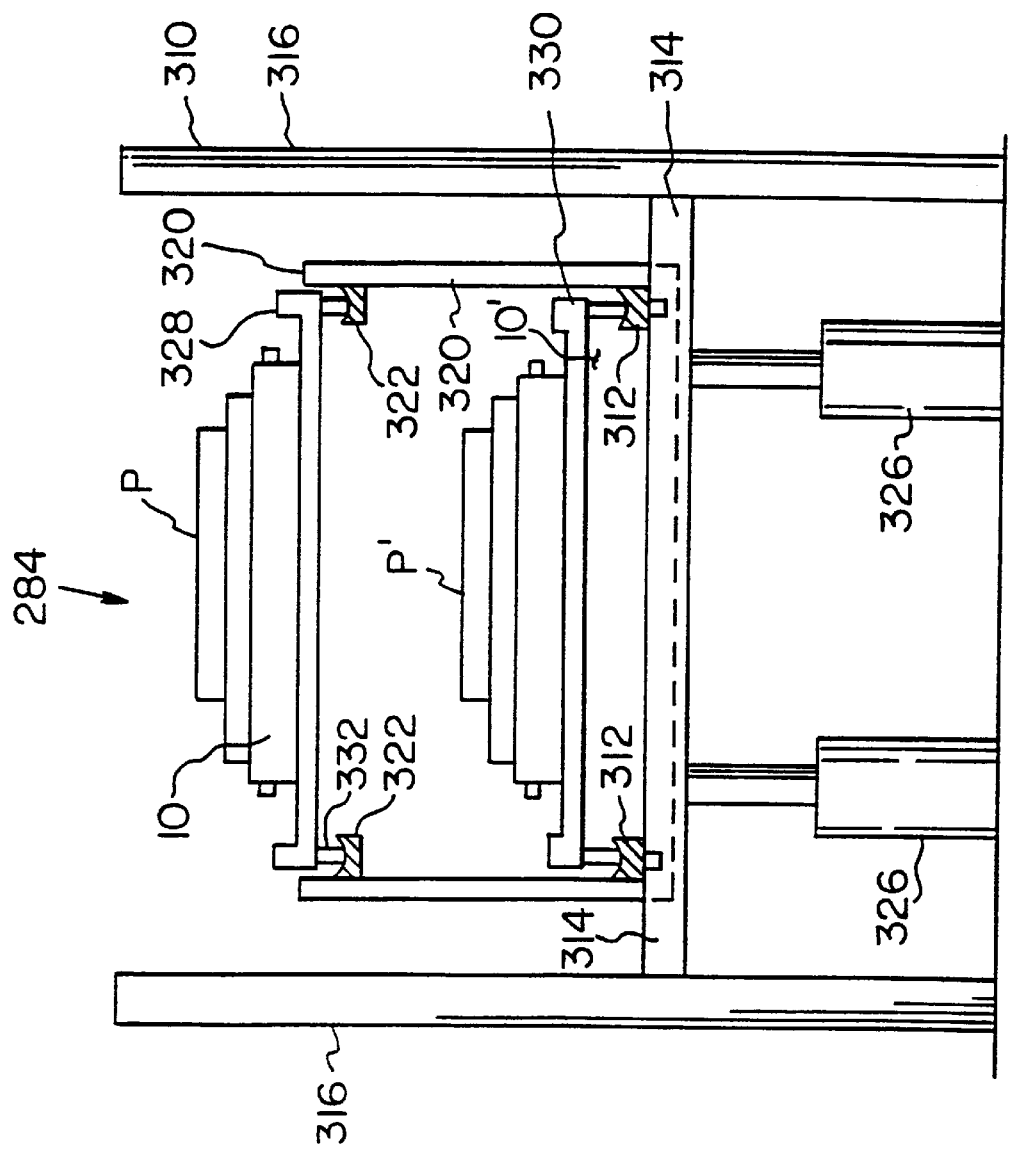
FIG. 20 is a section on line XX—XX of FIG. 17.
Figure 21:
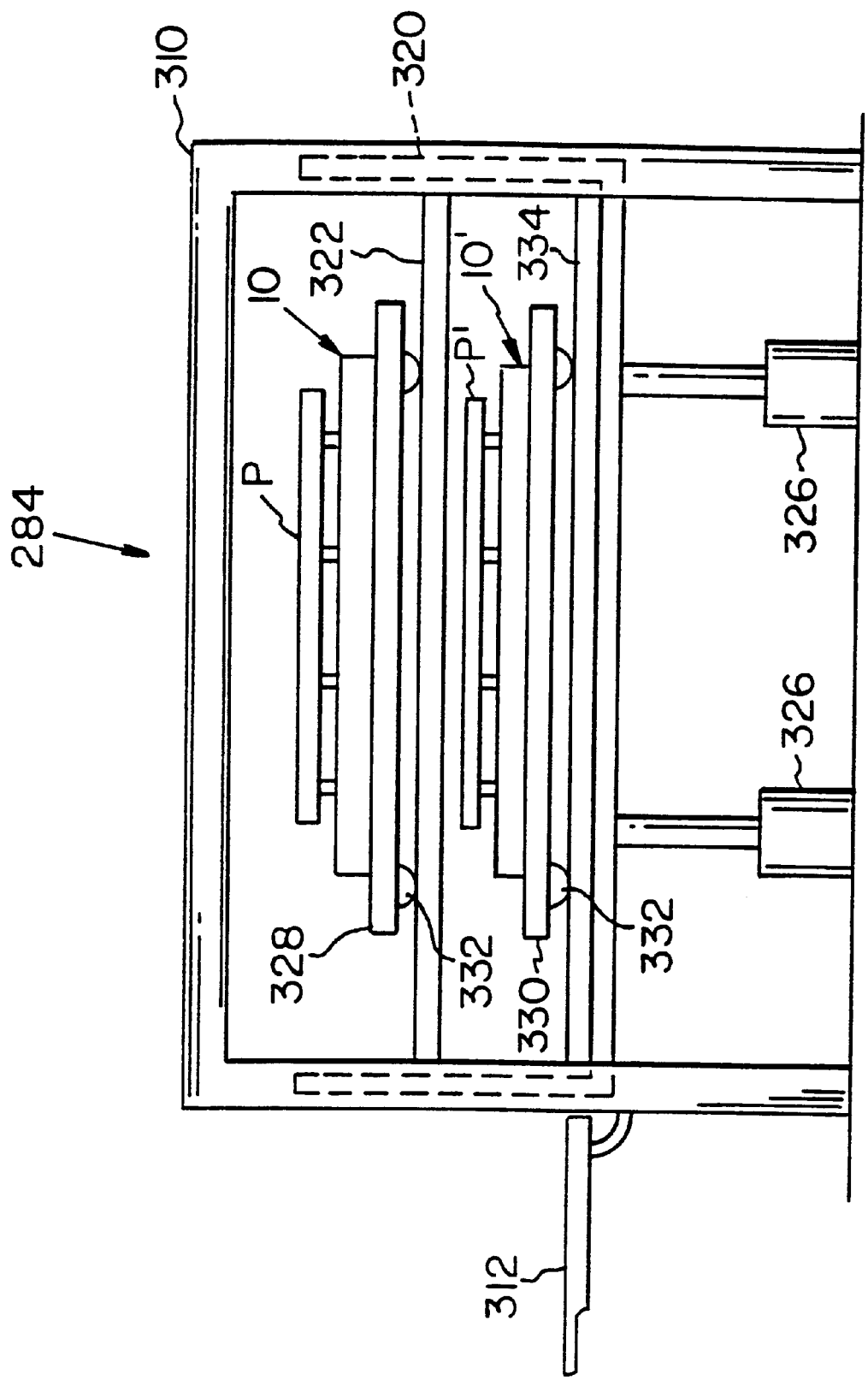
FIG. 21 is a side elevation of the system shown in FIG. 20.
Figure 22:
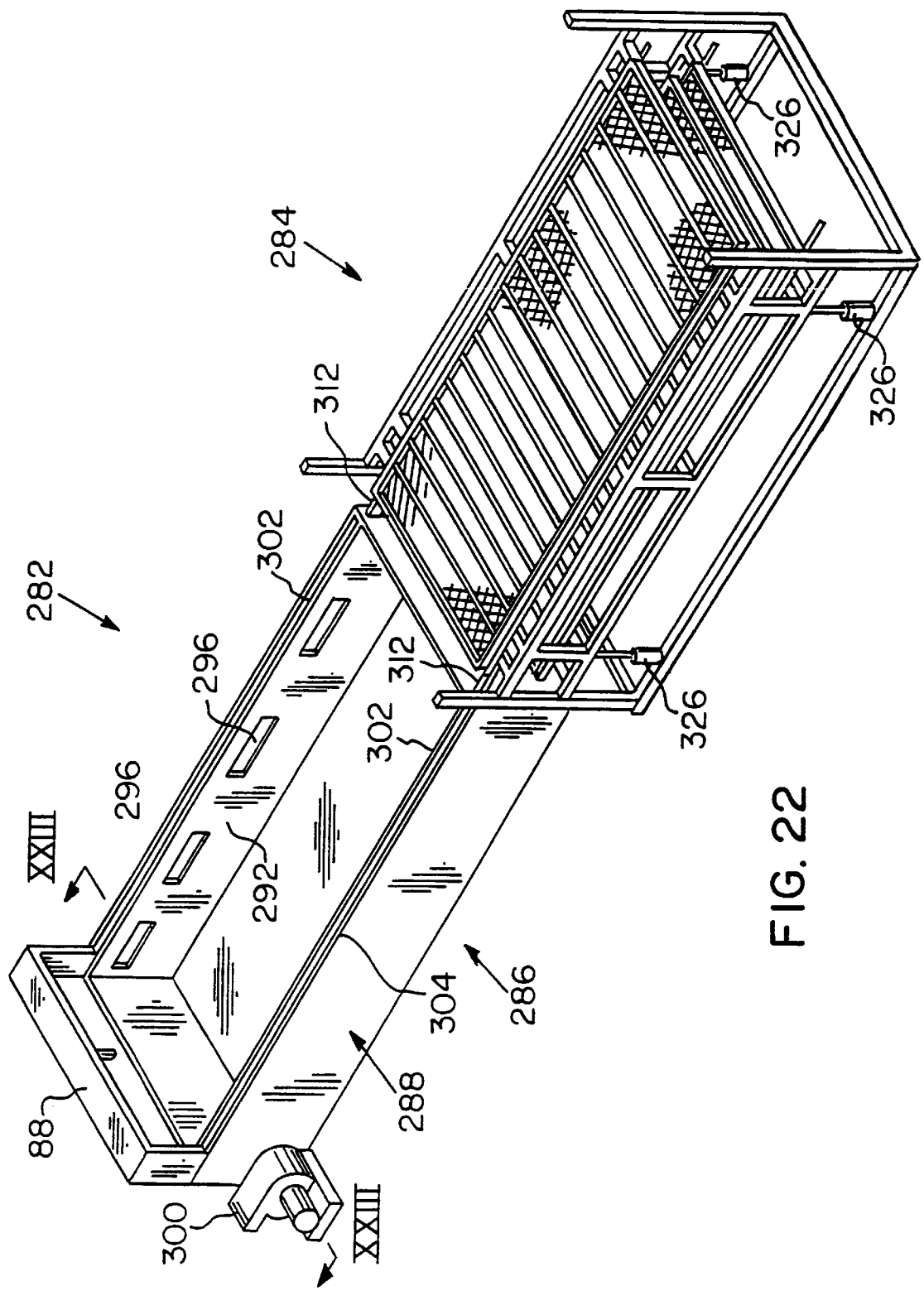
FIG. 22 is an isometric view of the handling system shown in FIGS. 17 and 18.

A shuttle-type material handling system according to another embodiment of the invention is designated 280 in FIGS. 17–23 of the drawings. The handling system 280 includes a processing station 282 and a support station 284. The processing station 282 includes an air evacuation assembly 286. As shown in FIGS. 22 and 23 of the drawings, the air evacuation assembly 286 includes a tank 288 having an open top and an outer wall 290 spaced from an inner wall 292 to form a gap 294 therebetween. The inner wall 292 includes a plurality of slots 296 which permit fluid communication between the interior of the tank 288 and the gap 294. The gap 294 is in flow communication with a discharge conduit 298 having a fan 300. A pair of substantially parallel processing station or support rails 302 having spaced positioning grooves 301 therein extends along the open top of the support station 284. As shown in FIG. 18 of the drawings, the support rails 302 have notched ends 303.

The processing station 282 further includes a conventional bridge-type cutting apparatus 88 movably carried on spaced rails 304 by wheels 306. The processing station 282 includes a plurality of removable covers 308 which can be placed across the open top of the air evacuation assembly 286 to cover a portion of the open top of the assembly.

Figure 19:
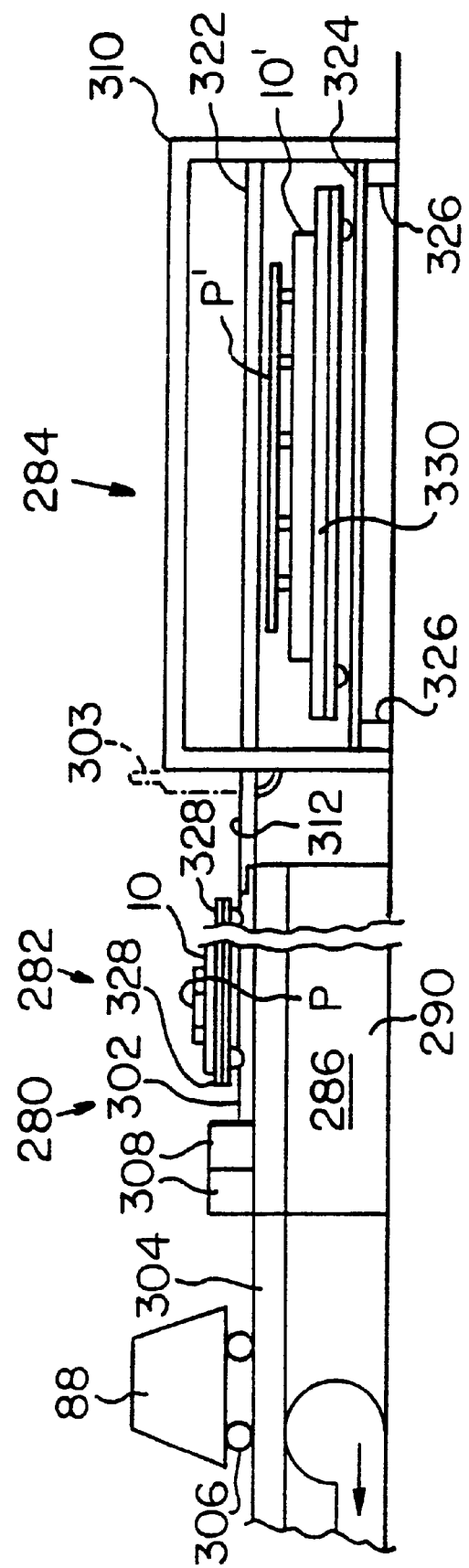
FIG. 19 is an elevation of the system shown in FIG. 17 showing the cart support rack in the lower position.

As shown in FIGS. 18–21 of the drawings, the support station 284 includes an outer frame 310 having a pair of support gate rails 312 pivotally mounted thereon and configured to pivot between a first or closed position, as shown in solid lines in FIG. 19 of the drawings and a second or open position, shown in dashed lines in FIG. 19 of the drawings. Each gate rail 312 has a notched end 313 and, as shown in FIG. 20 of the drawings, is pivotally mounted on a cross beam 314 which extends between opposed legs 316 of the outer frame 310.

As shown in FIGS. 20 and 21 of the drawings, the support station 284 further includes a cart elevator support rack 320 having a first or upper pair of rails 322 and a second or lower pair of rails 324. The upper pair of rails 322 define a first or upper tier of the support rack 320 and the lower pair of rails 324 define a second or lower tier of the support rack 320. The support rack 320 is carried on vertically movable lift elements 326, such as hydraulic pistons.

The material handling system 280 further includes a first cart 328 and a second cart 330. The carts 328 and 330 are similar to the carts 262 previously described with the exception that the wheels 332 of the carts 328 and 330 have an axis of rotation which is substantially perpendicular to the longitudinal axis of the carts.

Operation

The material handling system 50 shown in FIGS. 5–9 of the drawings using the pallet baskets 10 of the invention operates as follows. A number of pallet baskets 10 are pre-staged at the pallet holding area 136 and burning bars 30 are inserted into the slots 24 of the pallet baskets. The location and number of burning bars 30 and the profile of each individual bar 30 are determined by the size and shape of the parts to be cut from the metal plate P supported on the upper edges 32 of the burning bars 30. A number of metal plates P to be cut are stored in the workpiece supply area 142. The plates P from the workpiece supply area 142 are moved in conventional manner, such as by conveyor or forklift, to the pallet holding area 136 where they are loaded onto the pallet baskets 10.

The metal plate P to be cut is loaded by a conventional apparatus, such as a crane or a forklift, onto the upper edges 32 of the burning bars 30 in a first pallet basket 10 such that the plate P is approximately equidistant from both side supports 12 and end supports 14. The loaded pallet basket 10 is then transferred by the return conveyor 144 to the workpiece holding area 56. The lifting elements 158 of the lifting frame 152 are engaged, either manually or under computer control, with the lifting lugs 38 of the pallet basket 10 and the overhead crane system 150 lifts the loaded pallet basket 10 onto the loading station 55 of the first conveyor 52. Prior to transport of the pallet basket 10 along the first conveyor 52, the cutting torch 92 at the processing station 84 is in an upper position and the water level in the water table assembly 86 is lowered to a predetermined low position with the sealing elements 94 of the water table in the retracted position.

By remote control, the operator engages the conveyor motor 62 for the first conveyor 52 causing the loaded pallet basket 10 to advance in the direction of the arrow A shown in FIG. 9 of the drawings toward the second conveyor 54. When the pallet basket 10 reaches a predetermined position relative to the second conveyor 54, a limit switch is tripped causing the second conveyor 54 to advance at a speed which is synchronized with the speed of the first conveyor 52. As shown in FIG. 7 of the drawings, the bottom of the pallet basket 10 rests on top of the guard elements 78 of the second conveyor such that a small space is formed between the bottom of the pallet basket 10 and the top of the planar portion 76 of the conveyor trays 64.

The loaded pallet basket 10 is transported by the second conveyor 54 to a position below the cutting apparatus 88 at the processing station 84. When the pallet basket 10 leaves the first conveyor 52, the first conveyor 52 stops. The second conveyor 54 continues to advance until the pallet basket 10 is transported to a predetermined stop position with respect to the water table assembly 86. At this point, the second conveyor 54 stops and the sealing elements 94 of the water table assembly 86 are engaged as shown in FIG. 8 of the drawings. The water in the water table assembly 86 is raised to a predetermined level appropriate to the metal being cut. This may include a total submersion of the plate P. The conventional cutting apparatus 88 senses the alignment of the plate P on the pallet basket 10, establishes the true centerline of the plate P, compensates for any misalignment and then proceeds to cut or burn the plate P to shape in accordance with a predetermined program. During the cutting operation, the swarf and dross fall through the mesh bottom 16 of the pallet basket 10 onto the top of the planar portions 76 of the underlying conveyor trays 64 and are quenched by the surrounding water. The holes in the mesh bottom 16 of the pallet basket 10 are of sufficient size to permit the swarf and dross to fall through the mesh bottom 16 but the cut parts and plate skeleton are retained on the bottom 16.

While the burning of plate P proceeds at the processing station 84, a second pallet basket 10' having a new metal plate P' to be cut is placed on the loading station 55 of the first conveyor 52 by the overhead crane 150 as described above. Upon completion of the burning of the first plate P, the water level in the water table assembly 86 is lowered and the sealing elements 94 are retracted. The first conveyor 52 and second conveyor 54 are then advanced automatically. The first conveyor 52 carries the new loaded pallet basket 10' onto the second conveyor 54. As the second conveyor 54 advances, the first pallet basket 10 and cut pieces from plate P are transported to the discharge station 124 and the second loaded pallet basket 10' and new metal plate P' are transported into the processing station 84. When the second pallet basket 10' having the new plate P' to be cut is in proper position in the processing station 84 under the cutting apparatus 88, the second conveyor 54 is stopped, the water table sealing elements 94 are engaged, the water level is adjusted as required and cutting of the new plate P' is started. At this point, the first pallet basket 10 and cut plate P are located at the discharge station 124 adjacent to the processed parts receiving area 126. While new plate P' is being cut at the processing station 84, another loaded pallet basket is loaded onto the loading station 55 of the first conveyor 52 as described above.

At the discharge station 124, the pallet basket 10 having the cut plate P is off loaded by the overhead crane system 150 in a similar manner to the on loading of the pallet basket 10 described above. The pallet basket 10 is transported to the processed parts receiving area 126 by the crane system 150. Thus, the entire charge of the pallet basket 10, i.e., cut parts plus scrap pieces and the plate skeleton, are completely off loaded at the discharge station 124 in a short and predictable period of time. Therefore, the second conveyor 54 need not be stopped for a long period of time while the cut parts, scrap pieces and plate skeleton are separately removed, as in the prior art. Thus, the duration of the cutting operation, not the off-loading operation, is the time controlling step of the material handling system 50 of the invention. The handling system 50 of the invention maximizes the number of plates that can be cut in a given period of time and prevents the loss of valuable cutting time at the processing station 84 while the cut parts from a previous cutting operation are removed at the discharge station 124.

From the processed parts receiving area 126, the pallet basket 10 and its charge are transferred by the unloading conveyor 130 to the parts unloading station 128 where the cut parts are removed as time permits using conventional lifting devices. Thus, in the present handling system 50, the delay caused by the time required to separate the cut parts from the scrap is moved from the second conveyor 54 to the parts unloading station 128 where sufficient space, equipment and manpower can be allocated to insure smooth production. If the plate cutting time at the processing station 84 is short, a plurality of pallet baskets 10 with the cut parts and scrap can be stored at the unloading station 128 until they can be unloaded. The off loading of the pallet baskets 10 to the discharge station 124 is not slowed down while the cut parts are unloaded from the pallet baskets 10. Preferably, the cut parts are transferred to the finished parts storage area 132. The skeleton may be lifted to a scrap container in one piece or in many pieces and is then disposed of. Alternatively, after the cut parts are removed from the pallet basket 10, the pallet basket 10 containing the skeleton and scrap can be moved to a different location and the contents dumped into a scrap container. The emptied pallet basket 10 can then be returned for further use.

The unloaded pallet basket 10 is transported by the servicing conveyor 134 to the servicing area 138 where the burning bars 30 are inspected and repaired or replaced as needed and the accumulation of drops or small waste pieces attached to the mesh bottom 16 are gathered either manually or by means of magnetic or other devices and placed in a scrap container. Any remnants from the cutting operation remaining in the pallet basket 10 are transferred to the remnant storage area 140. Once the pallet basket 10 has been cleaned, inspected and the adhering material removed, the pallet basket 10 is transferred by the servicing conveyor 134 to the pallet holding area 136 to be inspected and reused. Alternatively, it is possible to store partially cut plates P on the pallet basket 10 in a rack for later cutting.

After cutting the new plate P' at the processing station 84, the pallet basket 10' and cut parts are carried by the second conveyor 54 to the discharge station 124 and are off loaded as described above. As shown in FIGS. 7 and 9 of the drawings, when the second conveyor 54 is indexed forward to move the pallet basket 10' to the discharge station 124, the trays 64 which were under the first pallet basket 10 during cutting carrying the swarf and dross from the first cutting operation are inverted at the discharge end of the second conveyor 54 such that the swarf and dross from the first cutting operation fall into one of the waste containers 100 at the waste removal station 98. By extending or retracting the piston rod 108 of the piston assembly 106, the waste containers 100 are positioned such that the debris, such as swarf and dross material from different plates, for example, stainless steel, aluminum, carbon steel, etc., can be deposited in separate waste containers 100. This eliminates the need for separation of different types of waste accumulated in a single receptacle. The water spray assembly 110 is used to spray water onto the tilted conveyor trays 64 to help flush the swarf and dross into the waste container 100.

Operation of the handling system 50 using the modified processing station 160 shown in FIGS. 10 and 11 of the drawings will now be described. The transport of the pallet basket 10 with metal plate P into and out of the modified processing station 160 is the same as described above with respect to the plate processing station 84. However, once the pallet basket 10 and plate P are in position in the modified processing station 160, the suction fans 174 are activated to cause the smoke and fumes to flow from the modified processing station 160 through the gaps 166 and into the air ducts 172 as shown by the flow direction arrows F. As the plate P is cut, the smoke and fumes generated during the cutting operation are drawn through the gaps 166 and air ducts 172 and are discharged away from the modified processing station 160.

The operation of the material handling system 200 shown in FIGS. 12–15 of the drawings will now be described. In the initial operation of the handling system 200, both of the carts 262 and 262' are located at their respective loading stations 208 and 208' of the processing lines 202 and 202'. The internal chambers 250 and 250' are raised or lowered by the lifting elements 252 and 252' until the processing station rails 254 and 254' are in the same horizontal plane as the loading station rails 216 and 216'. Pallet baskets 10 and 10' having plates P and P' to be cut are located at the respective workpiece holding areas 206 and 206'. The loaded pallet baskets 10 and 10' are lifted, for example, by an overhead crane assembly as previously described herein, onto the carts 262 and 262' located at the loading stations 208 and 208'. The height of each internal chamber 250 and 250' is adjusted so that the processing station rails 254 and 254' are at the same height as the loading station rails 216 and 216'. The loading gate rails 220 and 220' are pivoted to the position shown in FIG. 13 to span the distance between the loading station rails 216 and 216' and the processing station rails 254 and 254'. As shown in FIG. 13 of the drawings, when the loading gate rails 220 are lowered, the notched ends 230 of the loading gate rails 220 abut the notched ends of the processing station rails 254 to provide a relatively level rail surface.

The carts 262 and 262' carrying the loaded pallet baskets 10 and 10' are then rolled across the loading station rails 216 and 216' and loading gate rails 220 and 220' onto the processing station rails 254 and 254'. The carts 262 and 262' are moved until the wheels 268 and 268' are located in the positioning grooves 256 and 256' of the processing station rails 254 and 254'. In a preferred method, the carts 262 and 262' are moved by hand. However, in an alternative method, the lifting devices 223 can be used to elevate the outer ends of the loading station rails 220 such that the carts 262 and 262' roll onto the processing station rails 254 and 254' by the force of gravity.

When the carts 262 and 262' are in position on the processing station rails 254 and 254' of the processing stations 210 and 210', the loading gate rails 220 and 220' are pivoted back to their upper, open position. The pivoting of the loading gate rails 220 and 220' is preferably done by conventional methods, such as hydraulic or electric motors, under the control of a PLC.

The cutting apparatus 258 is traversed along the rails 260 to the processing station 210'. The height of the internal chamber 250' is adjusted by the lifting elements 252' to adjust the height of the plate P' in the water tank 244' to attain the proper cutting height and the level of the water in the water tank 244' is adjusted in conventional manner by the water level control assembly 248' to the proper height for the cutting operation being conducted. Adjustment of the water level in a water tank having an internal chamber is well known in the art and is described, for example, in U.S. Pat. No. 4,220,318, which has been incorporated herein by reference. Cutting is then begun on plate P'.

While plate P' is being cut at processing station 210', the height of the internal chamber 250 in the water tank 244 is adjusted as previously described. When the cutting of plate P' is complete, the cutting apparatus 258 traverses back along the rails 260 into position above plate P at processing station 210. The height of the internal chamber 250' in water tank 244' is then adjusted by the lifting elements 252' such that the processing station rails 254' are in the same plane as the discharge station rails 224'. The discharge gate rails 226' are lowered and the cart 262' carrying the pallet basket 10' having the cut parts from the plate P' is traversed across the discharge gate rails 226' to the discharge station rails 224' of the discharge station 212' of processing line 202'. The pallet basket 10' is then lifted from the discharge station 212' by, for example, an overhead crane assembly and is transported to the processed parts receiving area 214' where the cut parts can be off loaded from the pallet basket 10'.

After the pallet basket 10' has been lifted from the discharge station 212', the loading gate rails 220' are lowered and the empty cart 262' is transported back across the discharge gate rails 226', processing station rails 254' and loading gate rails 220' onto the loading station rails 216' of the loading station 208'. A new loaded pallet basket 10' is then lifted onto the cart 262' at the loading station 208'. The new pallet basket 10' is transported as previously described to the processing station 210'. When the new pallet basket 10' is in position at the loading station 210', the loading gate rails 220' and discharge gate rails 226' are again pivoted to their open positions to await the return of the cutting apparatus 258.

While the pallet basket 10' having the cut parts from plate P' was being unloaded from the processing line 202', the plate P on pallet basket 10 was being cut at the processing station 210. When the cutting operation on plate P is completed, the cutting apparatus 258 is traversed from processing station 210 back to processing station 210' to begin cutting new plate P'. When the cutting apparatus 258 has left the processing station 210, the height of the internal chamber 250 is adjusted, the discharge gate rails 226 are lowered and the cart 262 is traversed to the discharge station 212 as described above. The pallet basket 10 is lifted from the discharge station 212 to the processed parts receiving area 214 by the overhead crane assembly. The loading gate rails 220 are lowered and the empty cart 262 is traversed from the discharge station 212, across the processing station 210 to the loading station 208 and a new loaded pallet basket 10 is placed onto the cart 262 at the loading station 208. The cart 262 is then traversed back to the processing station 210 and the loading gate rails 220 and discharge gate rails 226 are pivoted to the closed position.

When the cutting apparatus 258 has completed cutting the new plate P' at the processing station 210', the cutting apparatus 258 is traversed back to the processing station 210 to begin cutting new plate P. The pallet basket 10' having the parts from new plate P' is traversed to the discharge station 212' and is unloaded as previously described and another cutting cycle is started.

For longer plates, i.e., longer than about 20 feet, the partition 246 is removed from the water tank 242. The larger plate is placed across both carts 262 and 262' which transport it to the processing stations 210 and 210' for cutting. The internal chambers 250 and 250' work in unison to raise and lower the carts 262 and 262' and the water level control assemblies 248 and 248' work in unison to adjust the water level in the water tank 242.

In the above-described method of operating the material handling system 200, the flow of material is in one direction, i.e., from the loading station 208 to the discharge station 212. However, in an alternative method the handling system 200 is operated with a reciprocal movement wherein cut parts are off loaded at both ends of the processing lines 202 and 202'. In this reciprocal method, pallet baskets having plates to be cut are staged adjacent both the loading stations 208 and 208' and the discharge stations 212 and 212'. The initial start up is the same as previously described. However, after the first cut plate P' is transferred to the discharge station 212' and the pallet basket 10' is off loaded, a new pallet basket 10' having a new plate P' to be cut is placed on the empty cart 262' at the discharge station 212'. The new pallet basket 10' is transported back to the processing station 210'. The discharge gate rails 226' are then pivoted to their open position. After the cutting apparatus 258 has cut plate P at the processing station 210, the cutting apparatus 258 returns to the processing station 210' to cut the new plate P'. While the cutting apparatus 258 is at the processing station 210', the pallet basket 10 having the cut parts from plate P is off loaded from the discharge station 212 and a new pallet basket 10 having a new plate P to be cut is on loaded onto the empty cart 262 at the discharge station 212. The cart 262 carrying the new pallet basket 10 and new plate P is then traversed back to the processing station 210 and the discharge gate rails 226 are pivoted to their open position.

After the cutting of new plate P' at processing station 210', the cutting apparatus 258 traverses back to the processing station 210 to begin cutting the new plate P. At this time, the loading gate rails 220' are lowered and the cart 262' carrying the cut pieces from new plate P' is traversed to the loading station 208' where the new pallet basket 10' and cut parts from new plate P' are removed by the overhead crane assembly and a new pallet basket having a new plate is on loaded onto the empty cart 262'. As will be understood by one skilled in the art, in this manner the flow of cut parts is in two directions, thus greatly increasing the speed at which the plates can be cut and removed from the material handling system 200.

The processing line 202 shown in FIG. 16 of the drawings is operated with the reciprocal loading and unloading which is described above in connection with the line shown in FIGS. 12–15 of the drawings. In the operation of processing line 202 shown in FIG. 16 of the drawings, a first cart 262 is initially positioned at the loading station 208 and a second cart 270 is positioned at the discharge station 212. A loaded pallet basket 10 having a plate P is lifted by the overhead crane assembly onto cart 262 at the loading station 208. The loading gate rails 220 are lowered and the cart 262 is moved into the processing station 210. The loading gate rails 220 are then pivoted to their open position and the cutting apparatus 258 is moved into position above the plate P to begin cutting. While plate P is being cut at the processing station 210, a second loaded pallet basket 10' having a plate P' is lifted onto the second cart 270 at the discharge station 212. After plate P has been cut, the cutting apparatus 258 is moved along rails 260 to clear the processing station 210 and the loading gate rails 220 are lowered. The pallet basket 10 having the cut parts from plate P is then moved from the processing station 210 back to the loading station 208. The loading gate rails 220 are pivoted to their open position and the pallet basket 10 is lifted by the overhead crane assembly from the loading station 208. While pallet basket 10 is being removed from the loading station 208, the discharge gate rails 226 are lowered and the loaded pallet basket 10' is moved into the processing station 210. The discharge gate rails 226 are then pivoted to their open position and the cutting apparatus 258 is moved into position at the processing station 210. While plate P' is being cut at the processing station 210, a new pallet basket 10 having a new plate P is on loaded onto the cart 262 at the loading station 208. After plate P' has been cut, the cutting apparatus 258 is traversed away from the processing station 210 and the discharge gate rails 226 are lowered. The pallet basket 10' is transported back to the discharge station 212, the discharge gate rails 226 are opened and the pallet basket 10' is lifted from the discharge station 212. As will be understood by one skilled in the art, this modified processing line 202 permits loading and unloading of pallet baskets with cut and uncut plates on both sides of the processing station 210 so that stations 208 and 210 function as both loading stations and discharge stations.

The operation of the material handling system 280 shown in FIGS. 17–22 of the drawings will now be described. The preferred initial start up position is shown in FIG. 19 of the drawings. The lift elements 326 are retracted such that the upper rails 322 of the cart support rack 320 are in the same plane as the support rails 302 and the gate rails 312 are in the lowered position. The first cart 328 is located on the support rails 302 at the support station 284 and the second cart 330 is located on the lower pair of rails 324 of the cart support rack 320. A first loaded pallet basket 10 having a plate P is lifted, for example, by an overhead crane assembly, onto the first cart 328. The cutting apparatus 88 is traversed along the rails 304 into position above the plate P. The discharge fan 300 is started to begin air flow from the support tank 288, through the slots 296, into the discharge conduit 298. Cutting is then begun on plate P. The air flow through the support tank 288 helps to reduce smoke and fumes from the cutting operation. As shown in FIGS. 17–29 of the drawings, removable covers 308 can be placed over a portion of the open top of the support tank 288 to decrease the size of the open top and thereby maximize the flow of air around the plate which is being cut.

While the plate P is being cut at the processing station 282, a second loaded pallet basket 10' having a plate P' is loaded, for example, by the overhead crane assembly, onto the second cart 330. After the plate P has been cut at the processing station 282, the cutting apparatus 88 is translated back to its starting position and the first cart 328 is traversed along the support rails 302 and the gate rails 312 onto the upper pair of rails 322 of the cart support rack 320. The lifting elements 326 are then extended to lift the entire cart support rack 320 from the lowered position shown in FIG. 19 of the drawings, where the upper rails 322 are aligned with the gate rails 312, to the upper position shown in FIG. 18 of the drawings, wherein the lower rails 324 are aligned with the gate rails 312. The second cart 330 carrying the loaded pallet basket 10' with the plate P' to be cut is then transferred from the cart support rack 320 across the gate rails 312 and onto the support rails 302 to the processing station 282. The cutting apparatus 88 is then traversed along the rails 304 into position at the processing station 282 to begin cutting the plate P'.

While plate P' is being cut, the first pallet basket 10 is off loaded from the first cart 328 by the overhead crane assembly and a new pallet basket 10 having a new plate P is lifted onto the first cart 328. After the plate P' has been cut at the processing station 282, the second cart 330 is transferred onto the lower rails 324. The cart support rack 320 is lowered such that the upper rails 322 are aligned with the gate rails 312 and the first cart 328 with the loaded pallet basket 10 and plate P is rolled onto the processing station 282 for cutting. The pallet basket 10' with the cut parts from plate P' is then lifted off of the second cart 330 and a new pallet basket 10' having a new plate P' is lifted onto the second cart 330. This cutting cycle is then continued. Thus, the upper and lower tiers of the cart support rack 320 function as both loading and discharge stations.

Alternatively, the lifting elements 326 can be retracted such that the cart support rack 320 is lowered to its lowermost position. In this position, the cut parts from the plate P can be removed by hand from the pallet basket 10. In order to provide improved access to the pallet basket on the cart support rack 320, the gate rails 312 can be pivoted to an open position as shown in dotted lines in FIG. 19 of the drawings.

It will be readily appreciated by those skilled in the art that modifications may be made to the invention without departing from the concepts disclosed in the foregoing description. Such modifications are to be considered as included within the following claims, unless the claims by their language expressly state otherwise. Accordingly, the particular embodiments described in detail herein are illustrative only and are not limiting as to the scope of the invention which is to be given the full breadth of the appended claims and any and all equivalents thereof.

I claim:

1. A material handling system for processing a workpiece, said system including:
    means for supporting the workpiece during processing;
    a loading station;
    a processing station for treating the workpiece;
    a discharge station; and
    a wheeled cart configured to travel between said loading station, said processing station and said discharge station.

2. A material handling system for processing a workpiece, said system including:
    means for supporting the workpiece during processing;
    a loading station;
    a processing station for treating the workpiece;
    a discharge station; and
    a first cart and a second cart, with said first cart movable between said loading station and said processing station and said second cart movable between said discharge station and said processing station.

3. A material handling system for processing a workpiece, said system including:
    means for supporting the workpiece during processing;
    a loading station;
    a processing station for treating the workpiece;
    a discharge station; and
    means for transporting the workpiece between said loading station, said processing station and said discharge station;
    with a support station adjacent said processing station, said support station including:
        a vertically movable cart support rack having first rails and second rails;
        a pair of pivotally mounted gate rails adapted to extend between said support station and said processing station; and
        at least one lift element configured to move said support cart rack between a first position, wherein said first rails substantially align with said gate rails and a second position, wherein said second rails substantially align with said gate rails.

4. A material handling system for processing a workpiece, said system including:
    means for supporting the workpiece during processing;
    a loading station;
    a processing station for treating the workpiece;
    a discharge station; and
    means for transporting the workpiece between said loading station, said processing station and said discharge station;
    with a support station adjacent said processing station, said support station including:
        a vertically movable cart support rack having first rails and second rails;
        a pair of pivotally mounted gate rails adapted to extend between said support station and said processing station; and
        at least one lift element configured to move said support cart rack between a first position, wherein said first rails substantially align with said gate rails and a second position, wherein said second rails substantially align with said gate rails;
    wherein said means for transporting comprises a pair of wheeled carts, wherein each of said carts is movable between said first rails, said processing station and said second rails.

5. A material handling system for processing a workpiece, said system comprising:
    a loading station having a pair of substantially parallel loading station rails;
    a processing station having a water tank with a vertically movable internal chamber having a top, said internal chamber having a pair of substantially parallel processing station rails mounted on said top of said internal chamber;
    a discharge station having a pair of substantially parallel discharge station rails;
    a pair of pivotally mounted loading gate rails adapted to extend between said loading station rails and said processing station rails;
    a pair of pivotally mounted discharge gate rails adapted to extend between said discharge station rails and said processing station rails; and
    a cart movable between said loading station, said processing station and said discharge station.

6. A material handling system for processing a workpiece, said system comprising:
    a loading station having a pair of substantially parallel loading station rails;
    a processing station having a water tank with a vertically movable internal chamber having a top, said internal chamber having a pair of substantially parallel processing station rails mounted on said top of said internal chamber;

a discharge station having a pair of substantially parallel discharge station rails;

a pair of pivotally mounted loading gate rails adapted to extend between said loading station rails and said processing station rails;

a pair of pivotally mounted discharge gate rails adapted to extend between said discharge station rails and said processing station rails; and a first cart and a second cart, with said first cart movable between said loading station and said processing station and said second cart movable between said discharge station and said processing station.

7. A material handling system as set forth in claim 5, wherein said cart has wheels and a mesh bottom.

8. A material handling system for processing a workpiece, said system comprising:

a processing station;

a support station adjacent said processing station;

a pair of gate rails adapted to extend between said support station and said processing station;

a vertically movable cart support rack located at said support station, said cart support rack including first rails and second rails;

at least one lift element configured to move said cart support rack between a first position, wherein said first rails align with said gate rails and a second position, wherein said second rails align with said gate rails;

a first cart; and a second cart, wherein said first cart and said second cart are movable between said first rails, said processing station and said second rails.

9. A method for transporting a workpiece from a first location to a second location in a material handling system, said method including the steps of:

placing the workpiece on a pallet basket;

loading said pallet basket and the workpiece onto a cart at a loading station;

positioning a pair of loading gate rails in a first position, wherein said loading gate rails extend between said loading station and a processing station;

moving said cart carrying said pallet basket from said loading station to said processing station over said loading gate rails;

positioning said loading gate rails in a second position, wherein said loading gate rails do not extend between said loading station and said processing station;

processing the workpiece at said processing station;

positioning a pair of discharge gate rails in a first position, wherein said discharge gate rails extend between said processing station and a discharge station;

moving said cart carrying the processed workpiece from said processing station to said discharge station over said discharge gate rails;

positioning said discharge gate rails in a second position, wherein said discharge gate rails do not extend between said processing station and said discharge station; and removing said pallet basket with the processed workpiece from said discharge station.

10. A method for transporting a workpiece as set forth in claim 9, including:

positioning said cart with said pallet basket thereon onto the top of an internal chamber at said processing station; and vertically moving said internal chamber to adjust said cart into a cutting position for the workpiece.

11. A method of transporting a workpiece from a first location to a second location in a material handling system including a processing station, said method comprising the steps of:

placing a first workpiece on a first pallet basket;

placing a second workpiece on a second pallet basket;

placing said first pallet basket on a first cart at said first location;

placing said second pallet basket on a second cart at said second location;

positioning a pair of loading gate rails in a first position, wherein said rails extend between said first location and said processing station;

transporting said first cart across said loading gate rails to said processing station;

moving said loading gate rails into a second position, wherein said loading gate rails do not extend between said first location and said processing station;

processing the first workpiece at said processing station;

moving said loading gate rails into said first position extending between said first location and said processing station;

transporting said first cart to said first location across said loading gate rails;

moving said loading gate rails into said second position;

removing said first pallet basket from said first cart at said first location;

positioning a pair of discharge gate rails in a first position, wherein said discharge gate rails extend between said second location and said processing station;

transporting said second cart from said second location to said processing station across said discharge gate rails;

moving said discharge gate rails into a second position, wherein said discharge gate rails do not extend between said second location and said processing station;

processing the second workpiece at said processing station;

moving said discharge gate rails into said first position extending between said second location and said processing station;

transporting said second cart from said processing station across said loading gate rails to said second location;

moving said discharge gate rails into said second position; and removing said second pallet basket from said second cart at said second location.

12. A method of transporting a workpiece from a first location to a second location in a material handling system including a processing station and a cart support rack, said method comprising the steps of:

placing a first pallet basket having a first workpiece on a first cart at said processing station;

placing a second pallet basket having a second workpiece on a second cart positioned on a first tier of said cart support rack adjacent said processing station;

processing the first workpiece at said processing station;

transporting said first cart and said first pallet basket from said processing station to a second tier of said cart storage rack substantially aligned with said processing station;

indexing said cart support rack such that said first tier of said cart support rack substantially aligns with said processing station;

transferring said second cart from said first tier of said cart support rack to said processing station;

removing said first pallet basket from said second tier of said cart support rack;

processing the second workpiece at said processing station;

placing a new pallet basket having new workpiece therein on said second tier of said cart support rack;

transferring said second cart with the second workpiece therein from said processing station to said first tier of said cart support rack;

indexing said cart support rack such that said second tier of said cart support rack substantially aligns with said processing station;

transporting said first cart with said new pallet basket from said second tier of said cart support rack to said processing station; and removing said second pallet basket from said first tier of said cart support rack.

* * * * *

UNITED STATES PATENT AND TRADEMARK OFFICE
CERTIFICATE OF CORRECTION

PATENT NO : 6,126,890
DATED : October 3, 2000
INVENTOR(S) : Harry E. Anderson

It is certified that error appears in the above-identified patent and that said Letters Patent is hereby corrected as shown below:

Title Page insert:
--Related U.S. Application Data
[60] Provisional application No. 60/001,672, Jul. 31, 1995--.

Column 2 Line 33 "irritates" should read --irritate--.

Signed and Sealed this

First Day of May, 2001

Attest:

NICHOLAS P. GODICI

*Attesting Officer*     *Acting Director of the United States Patent and Trademark Office*